United States Patent [19]
Trudeau et al.

[11] Patent Number: 5,850,989
[45] Date of Patent: *Dec. 22, 1998

[54] METHOD AND SYSTEM FOR RAPIDLY ASSEMBLING A LAUNCH VEHICLE

[75] Inventors: Howard D. Trudeau, Cupertino; David L. Sutphin, Saratoga; Donald E. Damon, Danville; Ernest R. Bedegrew; Filamon T. Cabrera, both of Santa Cruz; Douglas B. Pereyda, Los Gatos; Robert J. MacDonald, San Jose; Daniel H. Hada; Frank C. Havens, both of Cupertino, all of Calif.; Allan R. Tomasek, Georgetown, Tex.; Lee O. Taylor; Larry W. Edwards, both of Austin, Tex.

[73] Assignee: Lockheed Martin Corporation, Bethesda, Md.

[ * ] Notice: Under 35 U.S.C. 154(b), the term of this patent shall be extended for 115 days.

[21] Appl. No.: 511,345

[22] Filed: Aug. 4, 1995

Related U.S. Application Data

[63] Continuation-in-part of Ser. No. 198,818, Feb. 18, 1994, Pat. No. 5,529,264.

[51] Int. Cl.$^6$ ................................ B64F 1/04; B64F 1/10; B64F 1/12; F41F 3/04
[52] U.S. Cl. ............................ 244/63; 244/115; 244/116; 244/158 R; 89/1.805
[58] Field of Search .................................. 244/158 R, 54, 244/63, 114, 115, 116; 89/1.8, 1.801, 1.802, 1.805

[56] References Cited

U.S. PATENT DOCUMENTS

| | | |
|---|---|---|
| H1082 | 8/1992 | Andrew . |
| 2,604,045 | 7/1952 | Arnold . |
| 3,199,455 | 8/1965 | Samms . |
| 3,357,356 | 12/1967 | Bischoff . |
| 3,362,290 | 1/1968 | Carr et al. . |
| 3,453,960 | 7/1969 | Qualls . |
| 4,796,839 | 1/1989 | Davis . |
| 4,867,357 | 9/1989 | Inglis et al. . |
| 4,932,607 | 6/1990 | Layton et al. . |
| 4,964,340 | 10/1990 | Daniels et al. . |
| 5,046,426 | 9/1991 | Julien et al. . |
| 5,072,896 | 12/1991 | McIntyre et al. . |
| 5,104,067 | 4/1992 | McIntyre et al. . |
| 5,129,602 | 7/1992 | Leonard . |
| 5,141,181 | 8/1992 | Leonard . |
| 5,143,328 | 9/1992 | Leonard . |
| 5,167,386 | 12/1992 | Laquer et al. . |
| 5,172,875 | 12/1992 | Fried . |
| 5,203,844 | 4/1993 | Leonard . |
| 5,217,188 | 6/1993 | Thole . |
| 5,228,642 | 7/1993 | Bright . |
| 5,294,078 | 3/1994 | Gurr ...................................... 244/158 R |
| 5,529,264 | 6/1996 | Bedegrew et al. .................... 244/118.2 |

OTHER PUBLICATIONS

George P. Sutton, "Choosing a Rocket Engine" Space/Aeronautics—Dec. 1968.
Jack M. Vogel, "The Pocket Rocket Reader" date unknown.
Howard Trudeau "Lockheed Launch Vehicles" Apr. 1993.
Martin Marietta "Titan III Commercial Launch Services" 1987.
S. O. Perry and J. R. Clark "Space Research Vehicle Systems Developed from NASA Scout", Aug. 1959.

(List continued on next page.)

*Primary Examiner*—Charles T. Jordan
*Assistant Examiner*—Theresa M. Wesson
*Attorney, Agent, or Firm*—Holme Roberts & Owen

[57] ABSTRACT

A method and a system of assembling a launch vehicle vertically on an aboveground platform are presented in the present invention. The method of the present invention enables a rapid assembly of the launch vehicle; thus substantially reducing the final cost of the launch vehicle. The system of the present invention includes a plurality of specially designed tools that enable the rapid assembly of the launch vehicle.

28 Claims, 36 Drawing Sheets

OTHER PUBLICATIONS

Mark H. Daniels and James E. Davidson Conestoga Launch Vehicles: pp. 186 to 191 Aug. 1987 AIAA/DARPA Meeting on Lightweight Satellite Systems.

Michael D. Griffin and Joseph H. Jerger "Preliminary Design of the Industrial Launch Vehicle" pp. 241–247 AIAA/DARPA Meeting on lightweight satellite systems. Aug. 1987.

Norman E. Grizzell "Application of Fleet Ballistic Missile Components/Designs for Expendable Launch Vehicles" pp. 255–263 Aug. 1987 AIAA/DARPA Meeting on lightweight satellite systems.

E Prime Aerospace Corporation—EPAC S–1 and S–11 Payload User's Manual Nov. 29, 1988.

NASA Facts—An educational services publication of the National Aeronautics and Spce Administration—"United States Launch Vehicles for Peaceful Exploration of Space" vol. II, No. 5 Supplement—date unknown.

"All Solids Medium Launch Vehicle" publication No. 87193 Morton Thiokol, Inc. Oct. 16, 1986.

"Payload Launch Systems" Lockheed Aug. 1987.

7th Annual AIAA—Utah State Univesity Conference on Small Satellites—Lockheed Missiles & Space Company, Inc. D.E. Davis, J.W. Angeli, A.J. MacLaren, Sep. 13–16, 1993.

"International Aerospace Abstracts—Space Transportation Options and Opportunities" AIAA Library J.P. Loftus, Jr., R.C. Ried, R.B. Bristow 1987.

"Conestoga II—A Low Cost Commercial Space Transport System" Second symposium on Space Industrialization—NASA Publication 2313 pp. 169–172, 177–180, 184, 186, 189. Richard Rasmussen Feb. 1989.

"Expendable Launch Vehicles Technology" Report to the US Senate and the House of Representatives—NASA Library—Jul. 1990.

"Understanding Rockets and Their Propulsion" pp. 25–36 Craig Kuentz—Apr. 1964.

"From Earth to Orbit—An Assessment of Transportation Options" National Academy Press, Washington, D.C. 1992 NASA S&T Library Committee on Earth–to–Orbit Transportation Options, Aeronautics and Space Engineering Board, Commission on Engineering and Technical Systems, National Research Council.

"Assessment of Candidate Expendable Launch Vehicles for Large Payloads" National Academy Press, Washington D.C., Sep. 1984 Committee on NASA Scientific and Technological Program Reviews; Commission on Engineering and Technical Systems; National Research Council.

"US Access to Space—Launch Vehicle Choices for 1990–2010" Scott Pace—A Project Air Force Report—Mar. 1990.

"Guide to ELV's and the Commercial Launch Market"—Space Business News Staff 1986.

"Assured Access to Space 1986" Hearings before the Subcommittee on Space Science and Applications No. 164—Donald K. Slayton 1987.

"Launch Options for the Future—Special Report" U.S. Congress, Office of Technology Assessment—Jul. 1988.

"Reducing Launch Operations Cost—New Technologies and Practices" Congress of the United States. Library of Congress Catalog No. 88–600539.

National Space Launch Program Report to Congress—NASA S&T Library Mar. 14, 1989.

Solid Rocket Motor Space Launch Vehicles—43rd Congress of the International Aeronautical Federation, A.J. MacLaren; H.D. Trudeau, Aug. 1992.

Commercial Space Launch Act Jun. 5, 1984.

U.S Congress Office of Technology Assessment, "Big Dumb Boosters: A Low–Cost Transportation Option" (Washington D.C.: US Government Printing Office, Sep. 88).

Letter "Keep Our Rockets Simple" Aerospace America 1987.

"Space Technology to Meet Future Needs", Committee on Advanced Space Technology, National Academy Press, Washington D.C. 1987.

U.S. Commercial Space Policy Guidelines 1991.

E'Prime Aerospace Corporation Oct. 14, 1987.

Super Zip Separations Systems—Fact Sheet—By Lockheed Missiles & Space Company (Date Unknown).

Saab Ericsson Space Technical Data (date unknown).

AIAA, International Reference Guide to Space Launch Systems, "Ariane Operations", pp. 27–47, 1991.

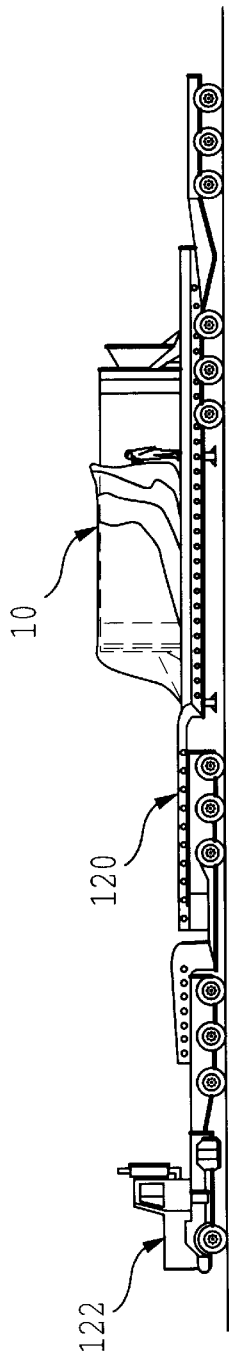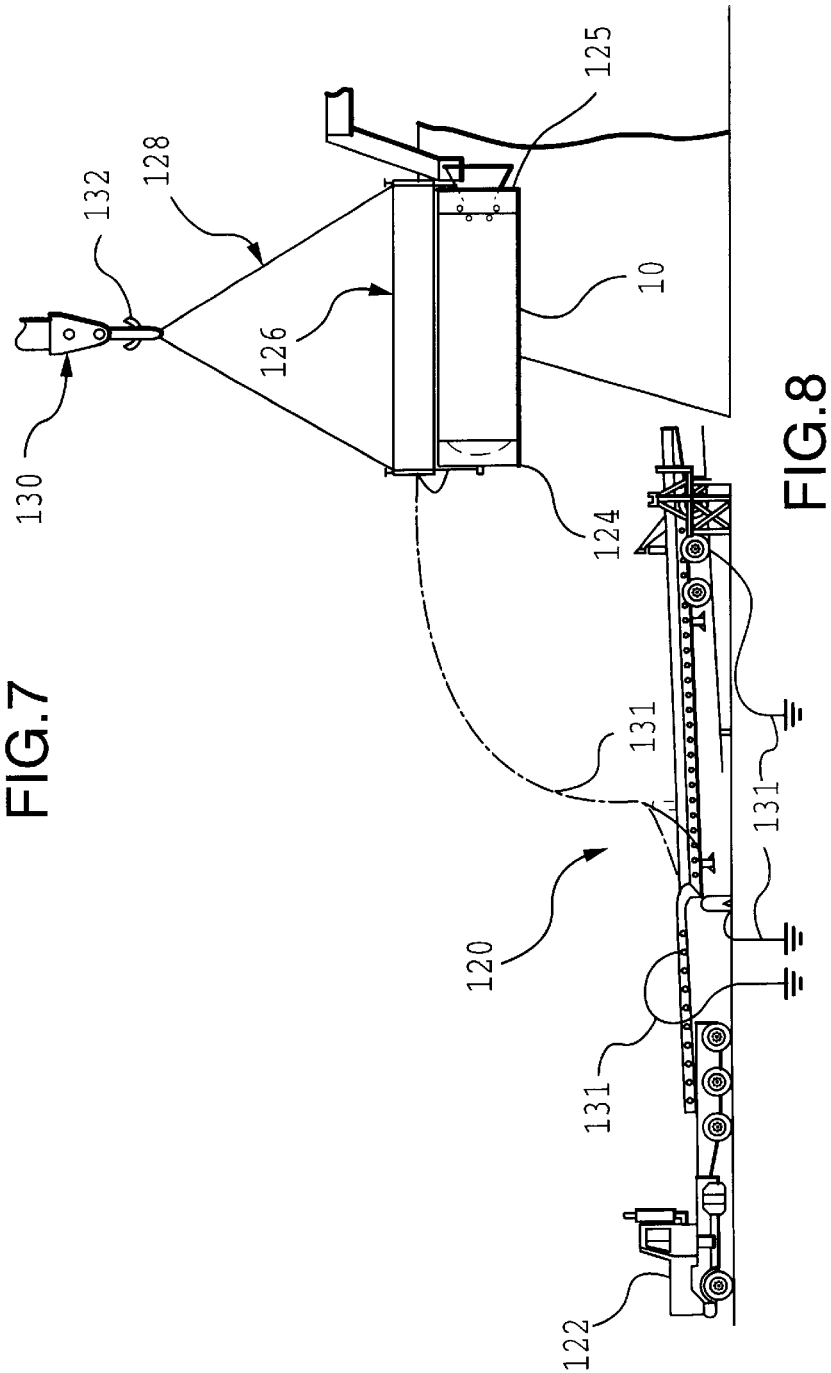

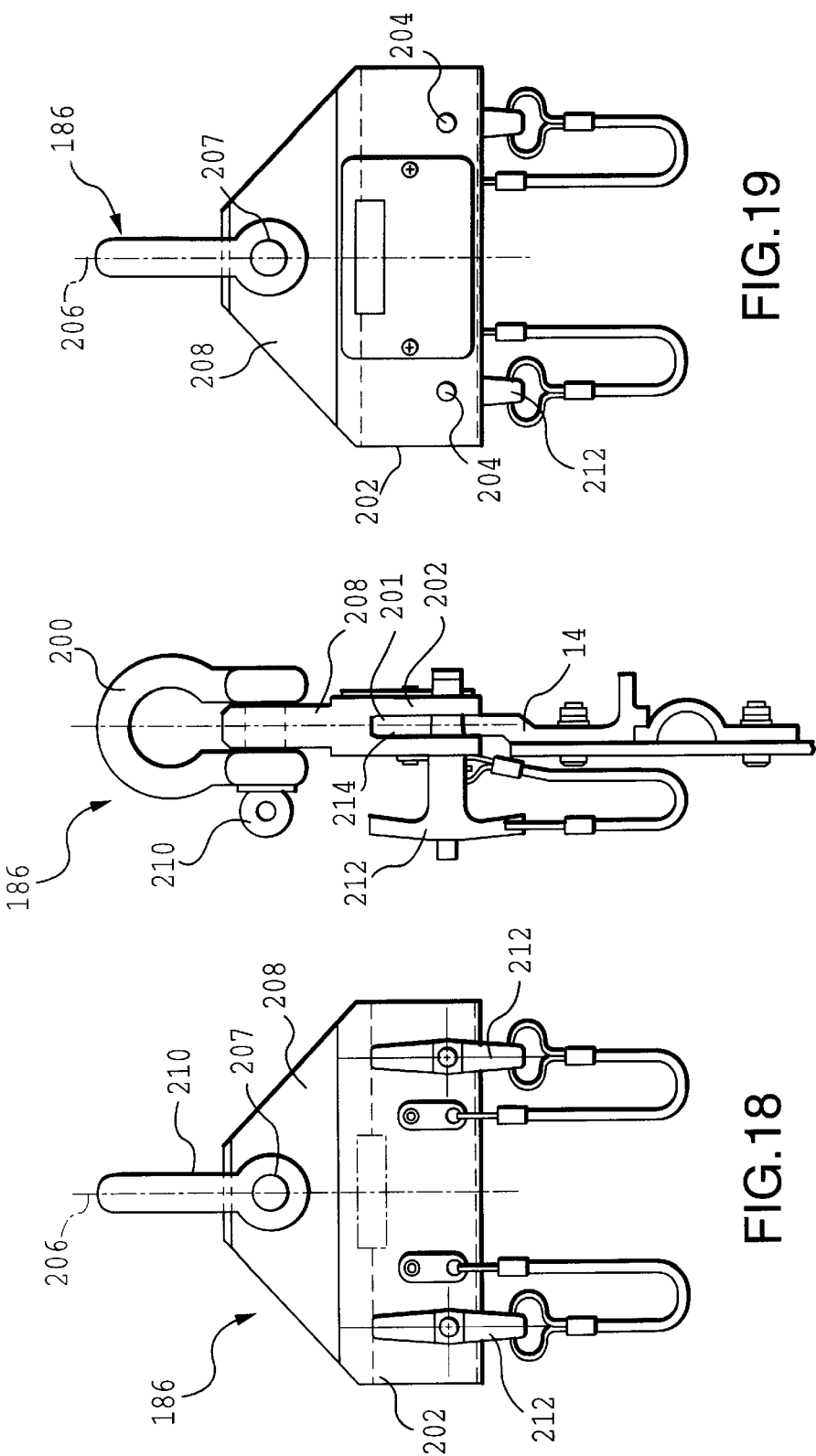

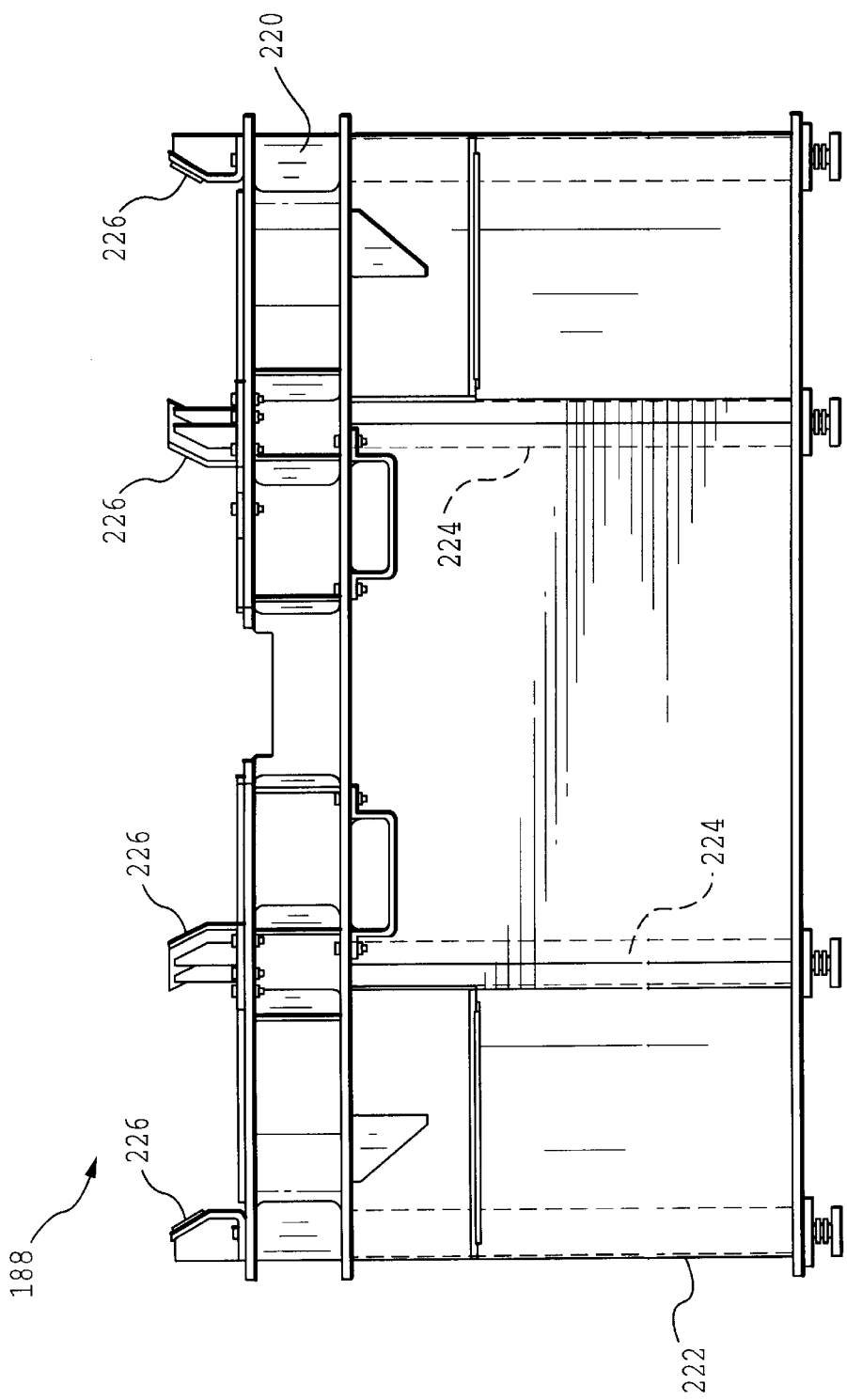

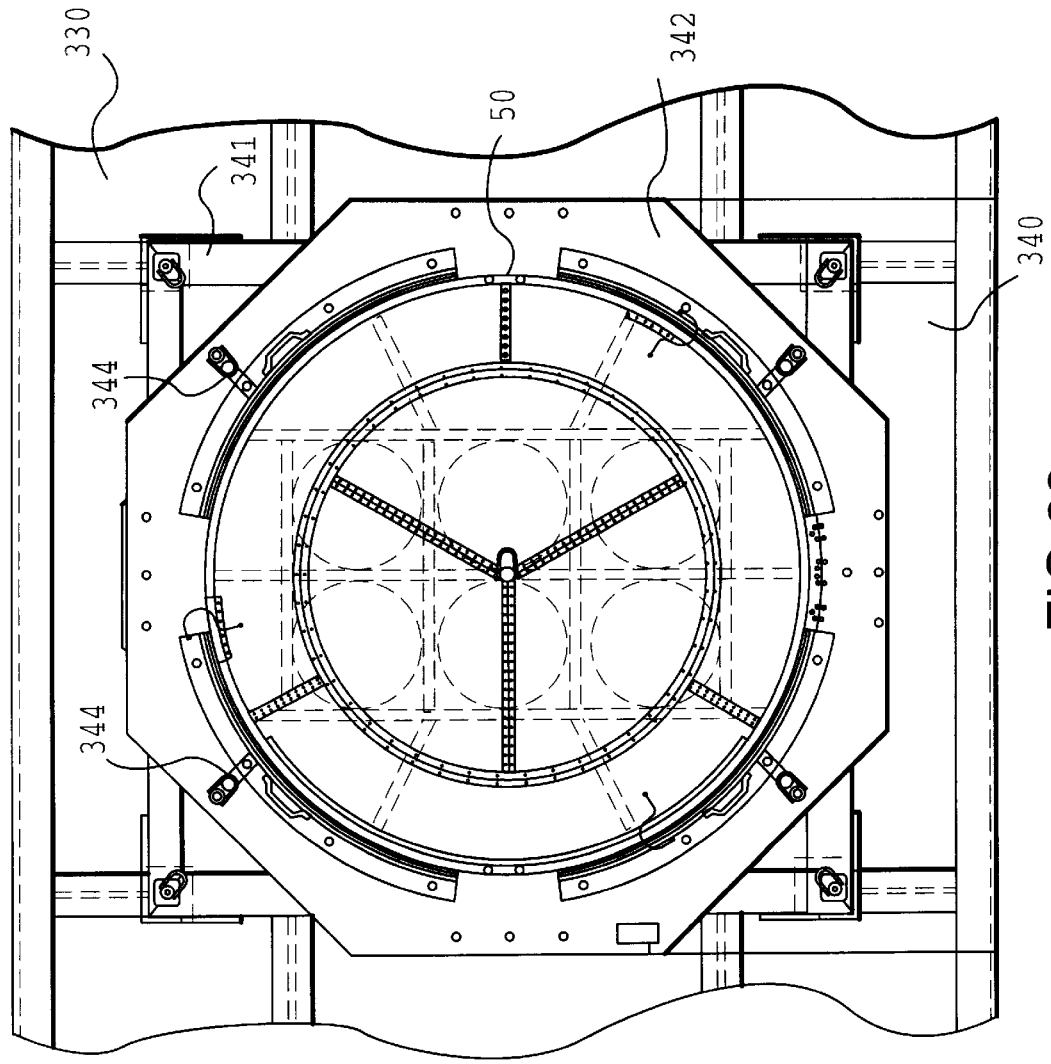

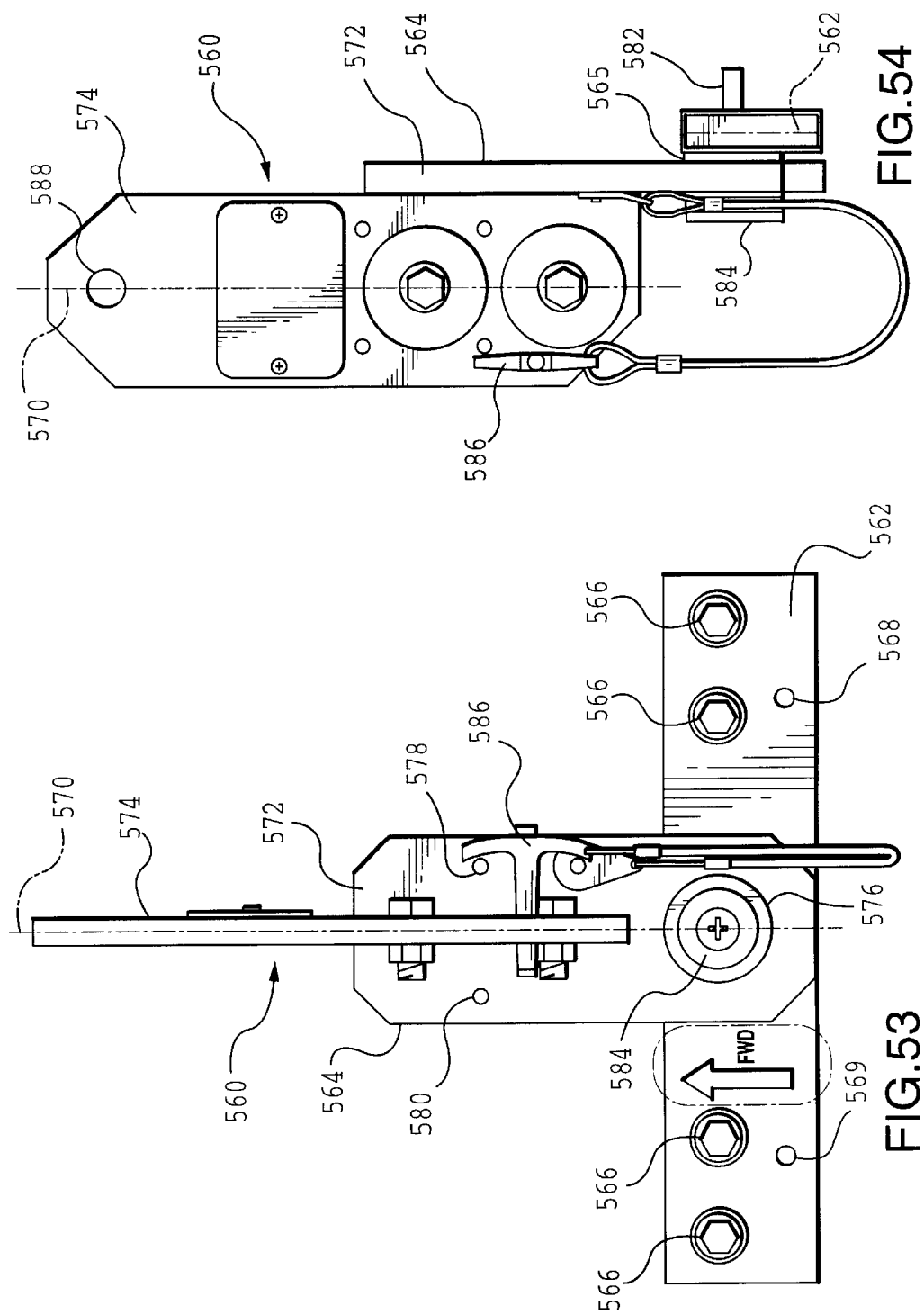

METHOD AND SYSTEM FOR RAPIDLY ASSEMBLING A LAUNCH VEHICLE

RELATIONSHIP TO APPLICATION

This patent application is a continuation-in-part of U.S. patent application Ser. No. 08/198,818 filed on Feb. 18, 1994 now U.S. Pat. No. 5,529,264.

BACKGROUND OF THE INVENTION

Launch vehicles typically use either solid-fuel rocket motors or liquid-fuel rocket motors. Liquid fuel rocket motors typically provide more energy efficient thrust. However, they are also more complex and more difficult to handle. Liquid fuel rocket motors were used extensively by the military.

The military then began to push the development of solid-fuel rocket motors which were more safe and less complex. However, even with these solid-fuel rocket motors, it typically took 3–9 months to launch a vehicle after the component parts had been manufactured. The prolonged assembly time of the launch vehicles increased the overall cost of the launch vehicle.

In addition, these long assembly times also created other problems. For example, since launch vehicles are typically assembled in a horizontal position, the sections of the launch vehicle deform when left in a horizontal position. This deformation causes additional time and money to be expended in an effort to correct these deformities. Also, after the launch vehicle has been assembled horizontally, the job of uprighting the entire launch vehicle requires expensive tools that further add to the cost of the launch vehicle.

U.S. Pat. No. 5,217,188 to Thole et al. discloses a system for assembling a launch vehicle wherein the launch vehicle is assembled horizontal and then pivoted to a vertical position using a scaffold. A system and method for vertically assembling a launch vehicle in a below-ground launch pad using a piston assembly is also disclosed. The expense and time to create a below-ground launch platform with a piston assembly is prohibitive.

No currently available system or method allows for the rapid vertical assembly of a launch vehicle on an existing above-ground launch platform.

OBJECTS AND SUMMARY OF THE INVENTION

It is therefore an object of the present invention to provide a system and method for rapidly assembling a launch vehicle in a vertical position on an existing above-ground launch platform.

It is another object of the present invention to provide a system and method for assembling a launch vehicle wherein the launch vehicle can be assembled in 15 days.

It is another object of the present invention to provide a system for vertically assembling a launch vehicle rapidly using specialized tools that facilitate the rapid assembly.

These and other objects of the present invention are provided by a method wherein a first-stage rocket motor is received in a horizontal position, rotated to a vertical position and positioned on an above-ground launch platform. Then, a horizontally positioned shroud is rotated to a vertical position and assembled with a payload assembly to form a shroud assembly. Then, the shroud assembly is positioned on the first-stage rocket motor.

In order to rotate the first-stage rocket motor, the method may use a stand assembly having a pivot. To rotate the horizontally-positioned shroud, a shroud skid having a pivot can be used. A handling bar is attached first to the bottom of the shroud and then to the pivot to rotate the shroud.

The system for rapidly assembling a launch vehicle uses a lifter that has a support frame and at least two lifting cables attached to the support frame. In addition, the lifter has brackets attached to each lifting cable that can be attached to and removed from various sections of the launch vehicle. The system also uses a transportation mechanism and a pivot to further facilitate the rapid assembly of a launch vehicle.

Other features and advantages of the present invention will become apparent from the following more detailed description and the drawings.

BRIEF DESCRIPTION OF THE DRAWINGS

FIG. 7 is a schematic side view of the first-stage motor horizontally positioned on a trailer.

FIG. 8 is a schematic representation of the second step in FIG. 6.

FIG. 17 is a front view of a removable adapter used in the present invention.

FIG. 18 is a side view of the removable adapter in FIG. 17.

FIG. 19 is a second side view of the removable adapter in FIG. 17.

FIG. 20 is a front view of a typical buildup stand used in the present invention.

FIG. 32 is a top view of an equipment section supported on a transportation assembly.

FIG. 53 is a front view of a lifting bracket used in the present invention.

FIG. 54 is a side view of the lifting bracket in FIG. 52.

DETAILED DESCRIPTION OF THE INVENTION

The present invention relates to a method and system for rapidly assembling a solid-fuel rocket motor launch vehicle vertically on an above-ground launch platform. Typically, solid-fuel rocket motor launch vehicles are used to deploy payloads into low earth orbit. However, the system and method of the present invention is not limited to solid-fuel rocket motor launch vehicles.

Figure 1:
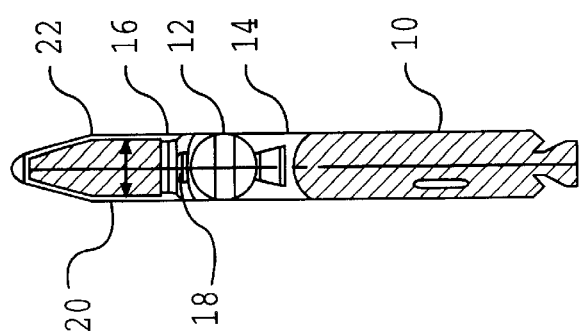
FIG. 1 is a sectional side view of an LLV1.
Figure 2:
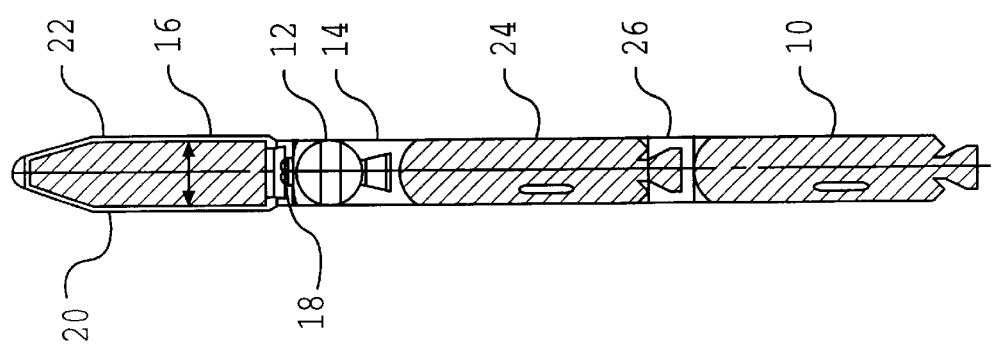
FIG. 2 is a sectional side view of an LLV2.
Figure 3:
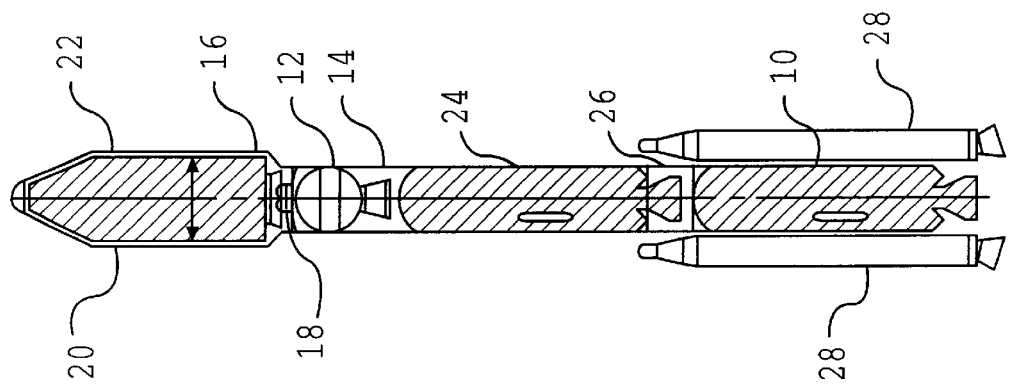
FIG. 3 is a sectional side view of an LLV3.

Three examples of launch vehicles that can be assembled by the method and system of the present invention are shown in FIGS. 1, 2 and 3. The launch vehicle in FIG. 1 is referred to as an LLV1 and includes a first-stage motor 10, a final-stage motor 12 and an interstage section 14 between the first-stage motor 10 and final stage motor 12. The LLV1 further includes an equipment section 16, which is mounted on the final-stage motor 12, and a shroud assembly 20, which is mounted on the equipment section 16. The equipment section 16 contains the necessary electronic control circuits (not shown) for the launch of the vehicle and control of the liquid fuel motors 18. The shroud assembly 20 includes a shroud 22 for housing a payload (not shown).

The first-stage motor 10 is preferably a Castor 120™ and can be obtained from Thiokol Corporation. The final-stage motor 12 is preferably an Orbus 21D solid fuel rocket motor that is manufactured by the Chemical Systems Division of United Technologies, Inc.

The vehicle in FIG. 2 is referred to as an LLV2. In addition to the above-mentioned sections of the LLV1, the LLV2 also includes a second-stage motor 24 mounted on the first-stage motor 10 by an interconnect section 26. The second-stage motor 24 is also a Castor 120™. The vehicle of FIG. 3 is referred to as an LLV3. In addition to the sections of the LLV2, the LLV3 launch vehicle includes at least two booster rockets 28 which are attached to the sides of the first-stage motor 10.

Figure 4:
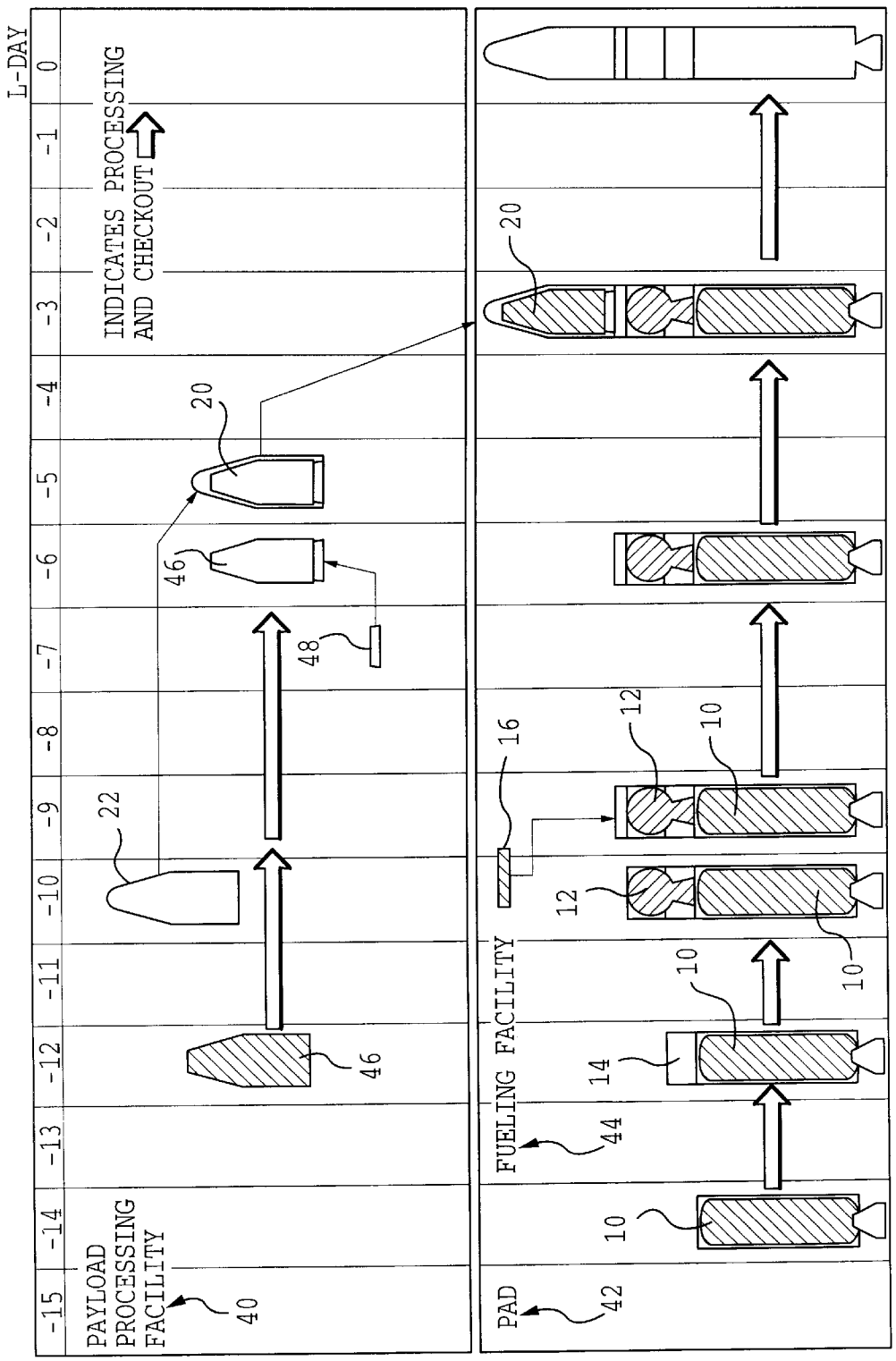
FIG. 4 is a project time-chart showing the method of assembling an LLV launch vehicle.

A schematic project timeline, as shown in FIG. 4, depicts the overall method of assembly. It is important to note that the method of assembling the launch vehicle, as described with reference to FIGS. 4 and 5, can be carried out completely independently of the payload processing. The number of days prior to launch shown in FIG. 4 are only approximate, but show how an LLV1 launch vehicle can be fully assembled within approximately fifteen days. A separate payload processing facility 40 and a pad area 42 are shown. In the method of the present invention, simultaneous assembly occurs at both the payload processing facility 40 and the pad area 42. Within the payload processing facility 40, a payload 46 is mounted on a payload adapter 48 between fifteen and six days before launch. Then, the shroud 22 is placed over the payload 46 and the payload adapter 48 to form the shroud assembly 20. The completed shroud assembly 20 is then transported over to the pad area 42 and mounted on top of a completed launch vehicle about three days before launch to allow for final pre-launch processing and testing.

At the same time that the shroud assembly 20 is being assembled in the payload processing facility 40, the launch vehicle is being assembled vertically in the pad area 42. There is also a fueling facility 44 that is located near the pad area 42 where the equipment section is loaded with hydrazine fuel. Initially, a first stage solid fuel rocket motor 10 is vertically placed in the pad area 42. Then, the interstage section 14 is stacked on the first stage solid fuel rocket motor 10. Next, the final stage rocket motor 12 is stacked on the interstage section 14. Then, the fueled equipment section located in the fuel facility 44 is stacked on the final stage rocket motor 12. Then, the completely assembled shroud assembly 20 is placed on the equipment section 16 to form a launch-ready LLV1 launch vehicle that can go through final checks.

The LLV2 and LLV3 launch vehicles are also assembled in a similar manner. This simultaneous processing of the launch vehicle and the payload allows a launch vehicle to be ready for launch rapidly. Typically, most launch vehicles require 3–9 months to assemble and launch. By contrast, using special tools and this simultaneous assembly, LLV1, LLV2 or LLV3 launch vehicles can be launched 15 days after the assembly was begun.

Figure 5:
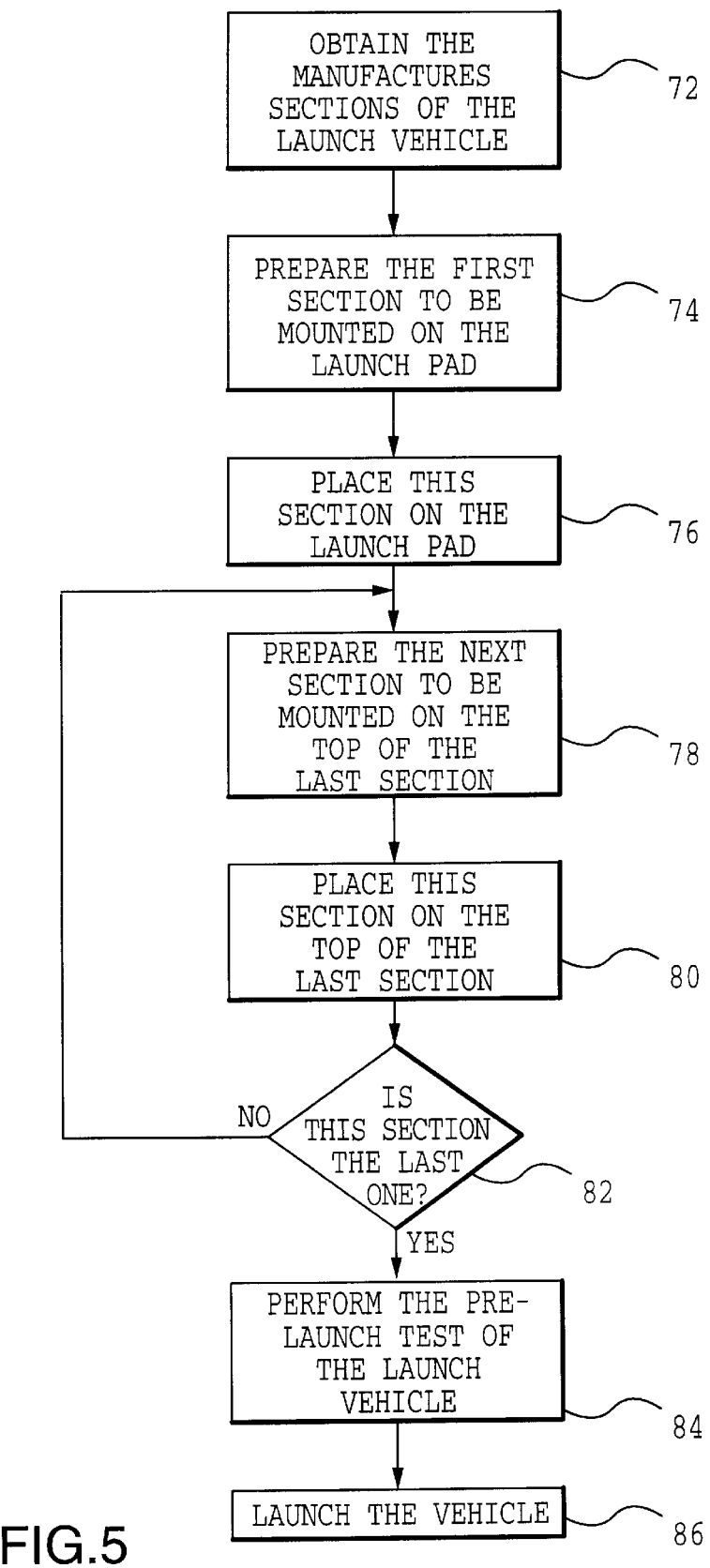
FIG. 5 is a flow chart outlining the method of the present invention.

A flow chart that depicts the overall method of assembling a launch vehicle according to the present invention is shown in FIG. 5. More detailed descriptions of each step and various special tools used to increase the speed of each step are provided in subsequent figures. In describing the method, reference is made to the sections of the LLV1 launch vehicle shown in FIGS. 2 and 4. First, in step 72, manufactured sections of the launch vehicle are received at the launch site. Some of these sections are manufactured by Lockheed Corporation and others are manufactured by other corporations such as those mentioned above.

In step 74, the first section of the launch vehicle is prepared to be placed on the launch pad. The first section is typically the first-stage motor. Thereafter, the first section is placed on a launch mount pedestal in step 76. Steps 78, 80, and 82 form a loop that is repeated for each section of the launch vehicle in addition to the first-stage motor. The number of repetitions of the loop depends on the launch vehicle. In step 78, the next section of the launch vehicle is prepared to be mounted on top of the previous section. In step 80, the next section is mounted on top of the previous section. In step 82, it is determined whether the section just mounted is the last section. If yes, the assembly method is completed and the pre-launch testing of the vehicle begins in step 84. On the other hand, if the section just mounted is not the last section, then steps 78–82 are repeated for the remaining sections of the vehicles. The vehicle is then launched once the results of the pre-launch tests are satisfactory in step 86.

For an LLV1 launch vehicle, the method involves placing a first-stage motor 10 vertically on a launch pad and stacking an interstage section 14 on top of the first-stage section 10. Next, the final-stage motor 12 is stacked on the interstage section 14. Next, an equipment section 16 is stacked on top of the final stage motor 12. Finally, the shroud assembly 20 is stacked on the equipment section. For an LLV2 or LLV3 launch vehicle, additional steps are required.

Steps 74 and 78 relate to the preparation and assembly of each section of the launch vehicle. The detailed method of preparing each section of an LLV1 launch vehicle is separately presented below. However, it should be mentioned that the present invention applies to any launch vehicle and is not limited to LLV1 type launch vehicles.

Figure 6:
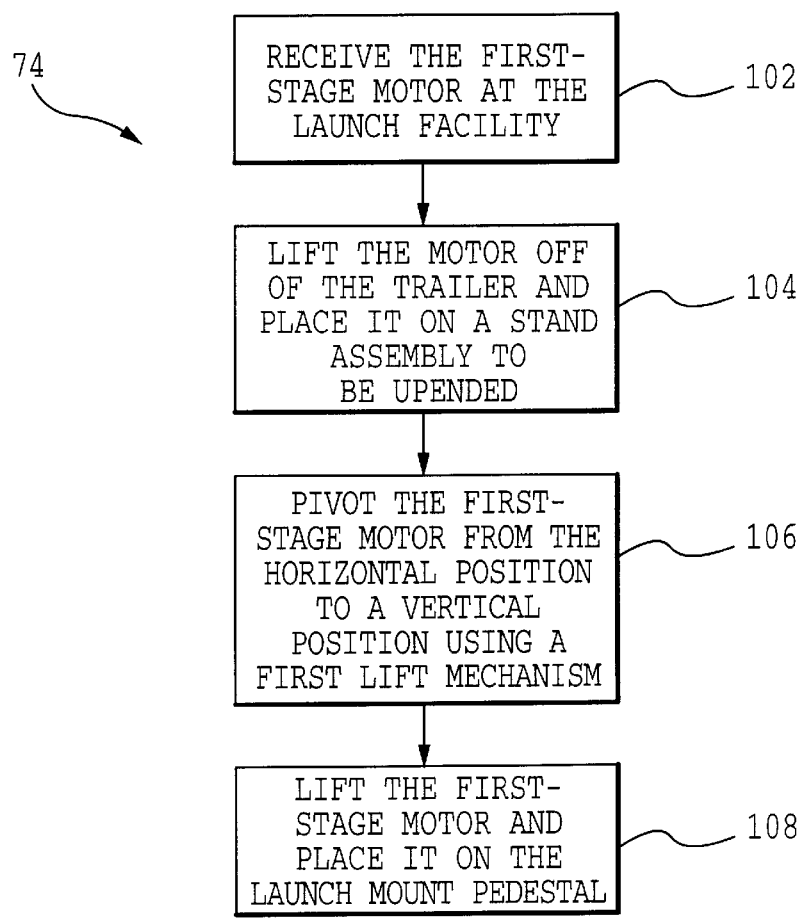
FIG. 6 is a flow chart outlining the process of preparing the first-stage motor according to the present invention.

First, the step of preparing of the first-stage motor (step 74) will be described and is shown in FIG. 6. First, the first-stage motor is received at the launch facility in step 102. The first-stage motor is then lifted off a trailer and placed on an assembly stand in step 104. While the first stage motor is on the assembly stand, it is pivoted from a horizontal position to a vertical position in step 106. Thereafter, it is lifted off the assembly stand and mounted on the launch mount pedestal in step 108. The various tools required to carry out steps 102–108 are described in more detail below with reference to FIGS. 7–12.

The first-stage motor 10 is typically transported to the launch facility on a specially designed wide body trailer 120 shown in FIG. 7. Because of the size and the weight of the first-stage motors, they are transported in a horizontal position. A tractor 122 is used to pull the trailer 120.

Figure 9:
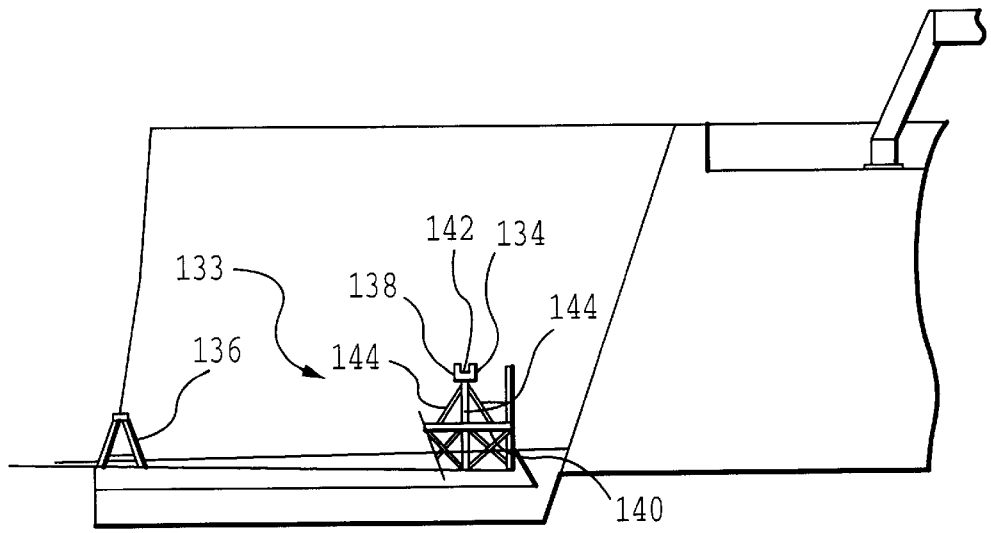
FIG. 9 is a schematic representation of the stand assembly used in the present invention.

The details of step 104 are schematically shown in FIGS. 8 and 9. As shown in FIG. 8, the first-stage motor 10 is transported to the launch facility with brackets 124 and 125 attached to its ends. The brackets 124, 125 facilitate the lifting of the first-stage motor 10. A set of trunnions are attached to the bracket 125. The trunnions are instrumental in pivoting the first-stage motor 10. Their function will be more clearly described with reference to FIG. 11. To lift the first-stage motor 10, a horizontal lifting beam 126 is connected between the brackets 124 and 125, as shown in FIG. 8. Thereafter, a sling 128 is connected to the lifting beam 126. The other end of the sling 128 is connected to a crane 130 through a hook adapter 132. The first stage-motor 10 is then lifted and placed on a stand assembly 133 shown in FIG. 9.

Each of the tools used to assemble the launch vehicle, including the trailer and stand assembly, are grounded through ground line 131. The ground lines prevent static electricity build-up. Throughout the entire process, all tools are grounded. However, for clarity, the ground lines 131 will not be shown in any subsequent figures.

The stand assembly 133 includes a breakover stand 134 and a forward stand 136. The forward stand 136 is shown more clearly in FIG. 10. The forward stand 136 receives the top of the first-stage motor 10 and the breakover stand 134 receives its base. The breakover stand 134 includes a top section 138 and a support section 140. The top section 138 includes a channel 142 to engage the trunnions attached to the bracket 125. The support section 140 includes a plurality of legs 144 which are attached to the top section 138 to support the weight of the first-stage motor 10.

Figure 10:
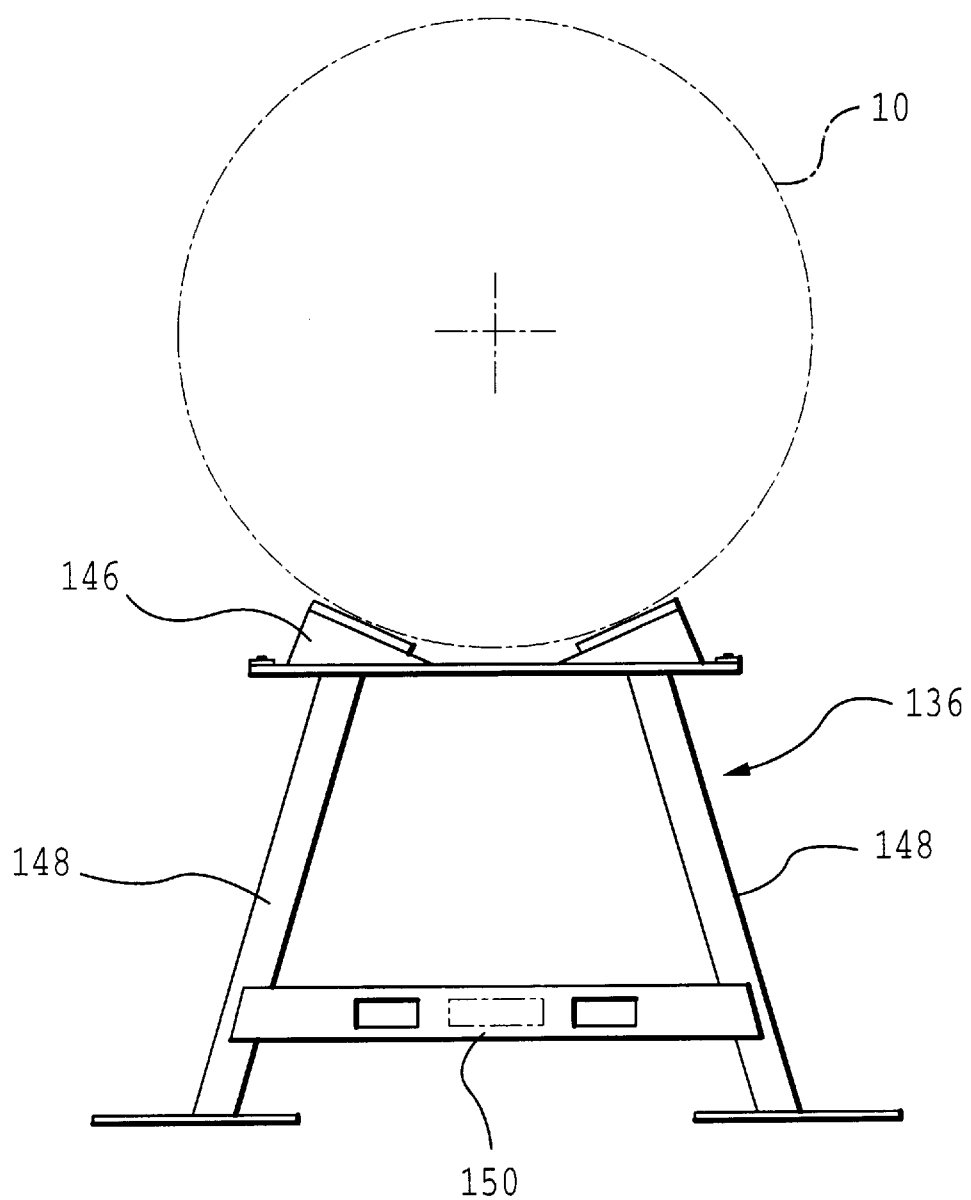
FIG. 10 is a front view of a first-stage motor which is placed on a stand assembly.

FIG. 10 is a front view of the first-stage motor 10 mounted on the stand assembly. The forward stand 136 includes a cradle 146 and legs 148 (two are shown) that are connected to the cradle 146. Horizontal bars 150 are attached to legs 148, as shown in FIG. 10, to further reinforce the structure of the forward stand 136.

Figure 11:
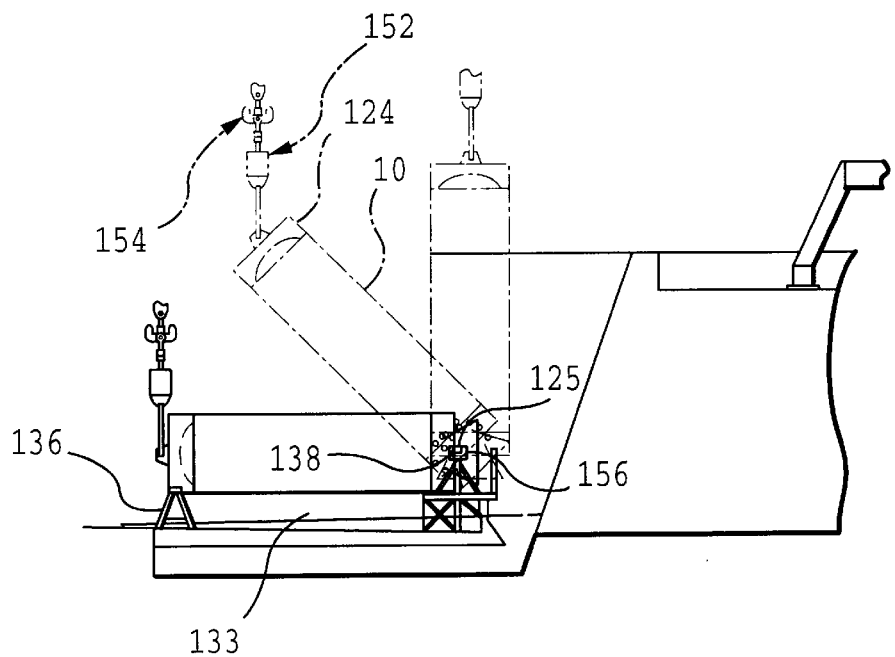
FIG. 11 is a schematic representation of the third step in FIG. 6.

The details of step 106 are schematically shown in FIG. 11. While the first-stage motor 10 is horizontally placed on the stand assembly 133, a vertical lift beam 152 is connected between bracket 124 and a hook 154 of a 200-ton MST crane (not shown). In operation, as shown in FIG. 11, the crane lifts the top end of the first-stage motor 10 while simultaneously moving horizontally to the right. Meanwhile, the trunnions 156 attached to bracket 125 engage channels 142 (FIG. 9) and rotate the base of the first-stage motor 10 to pivot about an axis defined by the trunnions 156. After step 106 the first-stage motor 10 is in a vertical position.

Figure 12:
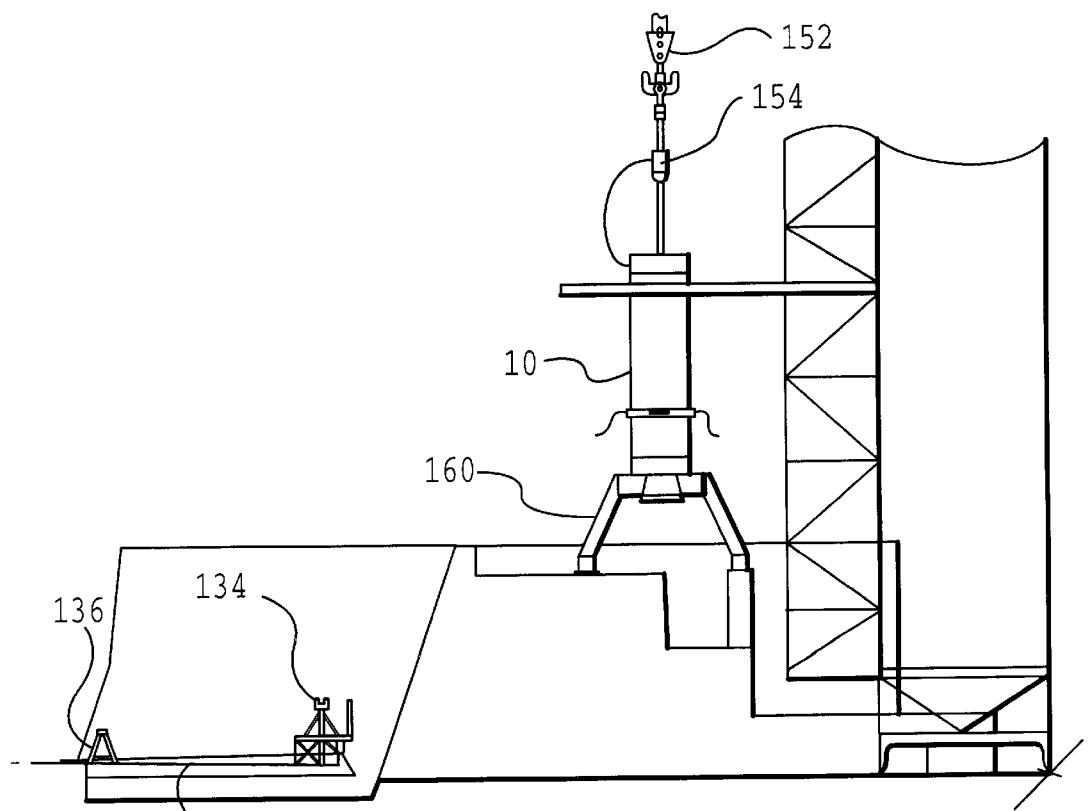
FIG. 12 is a schematic representation of the process of mounting the first-stage motor on the launch pad.

The details of step 108 are schematically shown in FIG. 12. Before lifting the first-stage motor 10 from the stand assembly 133, the bracket 125 is secured to the breakover stand 134 and is detached from the first-stage motor 10. Thus, the bracket 125 remains behind when the first-stage motor 10 is lifted. The first-stage motor 10 is lifted using a crane and positioned on a launch mount pedestal 160 on the above-ground launch pad. The stand assembly 133 is located near the launch pad to decrease delays in assembly.

Figure 13:
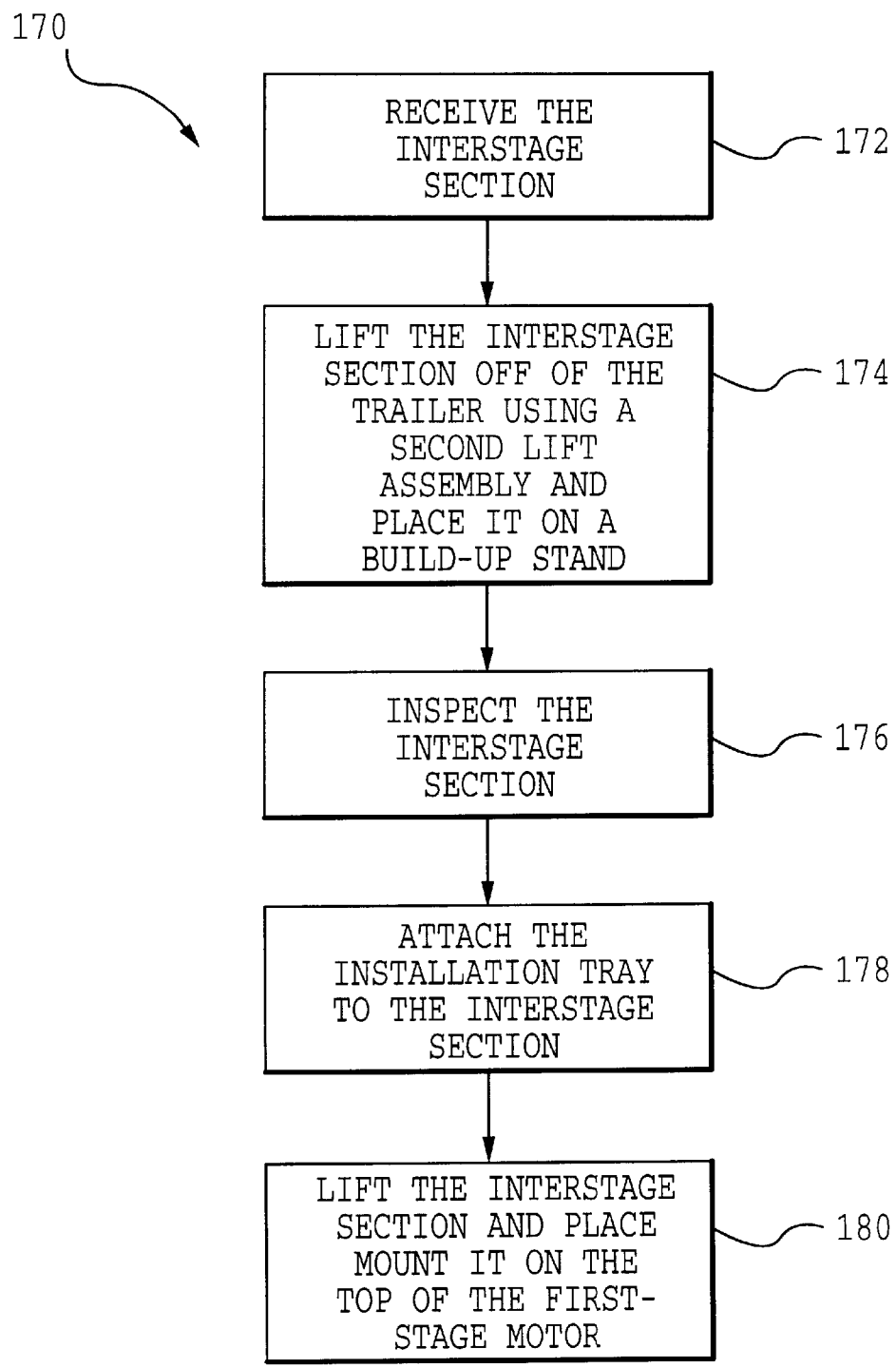
FIG. 13 is a flow chart outlining the process of preparing an interstage section.

Step 78 of FIG. 5 is used for both the interstage section and the final-stage motor section of the LLV1 launch vehicle. For an LLV2, step 78 is completed for the interstage section, the second-stage motor and final-stage motor. The sub-steps for the interstage are described with reference to FIG. 13 and the sub-steps for the final-stage motor are described with reference to FIG. 23. A method 170 for preparing an interstage section to be mounted on the first-stage motor is shown in FIG. 13. The interstage section is a shell structure that is used as an adaptor to mount the final-stage motor on the first-stage motor. The sub-steps of the method 170 and special tools used to complete the steps will be described with reference to FIGS. 14–22.

Figure 14:
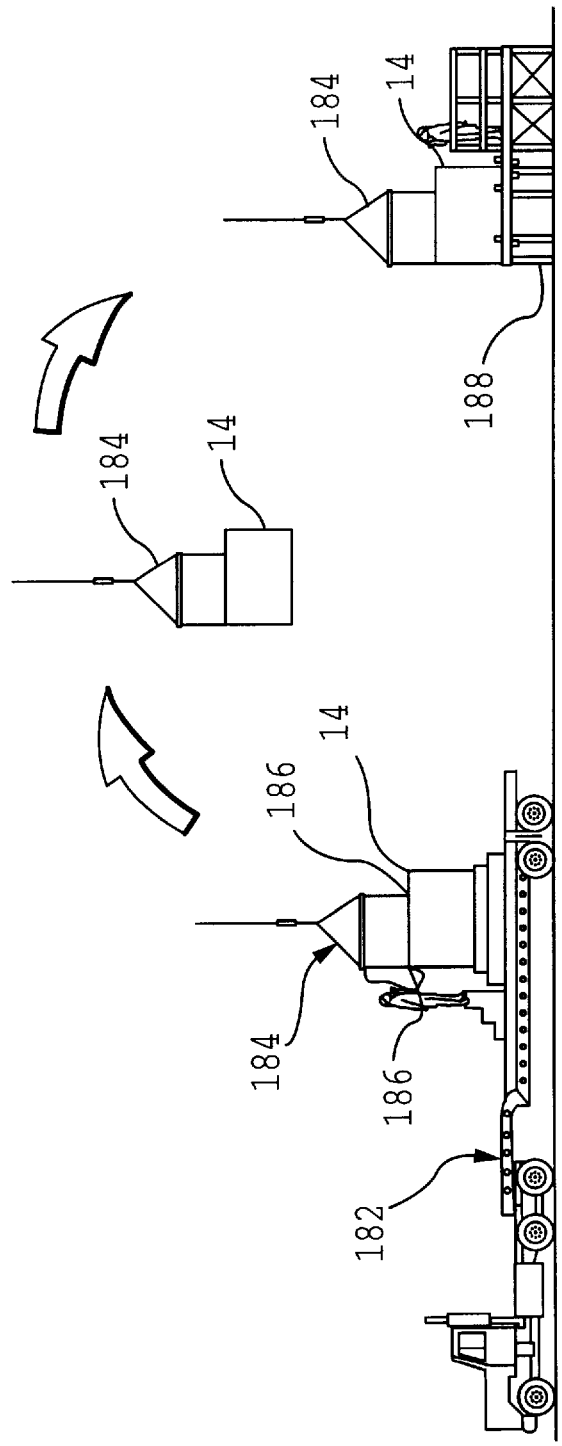
FIG. 14 is a schematic representation of the first two steps of the process in FIG. 13.

The method 170 begins by receiving the interstage section at the launch facility in step 172. Typically, the interstage sections are shipped to the launch facility on a flatbed trailer 182 as shown in FIG. 14. Thereafter, the interstage section is lifted from the trailer, placed on a buildup stand, and visually inspected for possible damages in steps 174 and 176. Next, an installation tray is attached to the interstage section in step 178. Finally, in step 180, the interstage section is mounted on the first-stage motor.

The details of step 174 are schematically shown in FIG. 14. The interstage section 14 is lifted from a trailer 182 using a component sling 184. The component sling 184 is attached to the interstage section 14 by removable brackets 186. The interstage section 14 is then lifted and placed on a buildup stand 188 by a crane (not shown).

Figure 15:
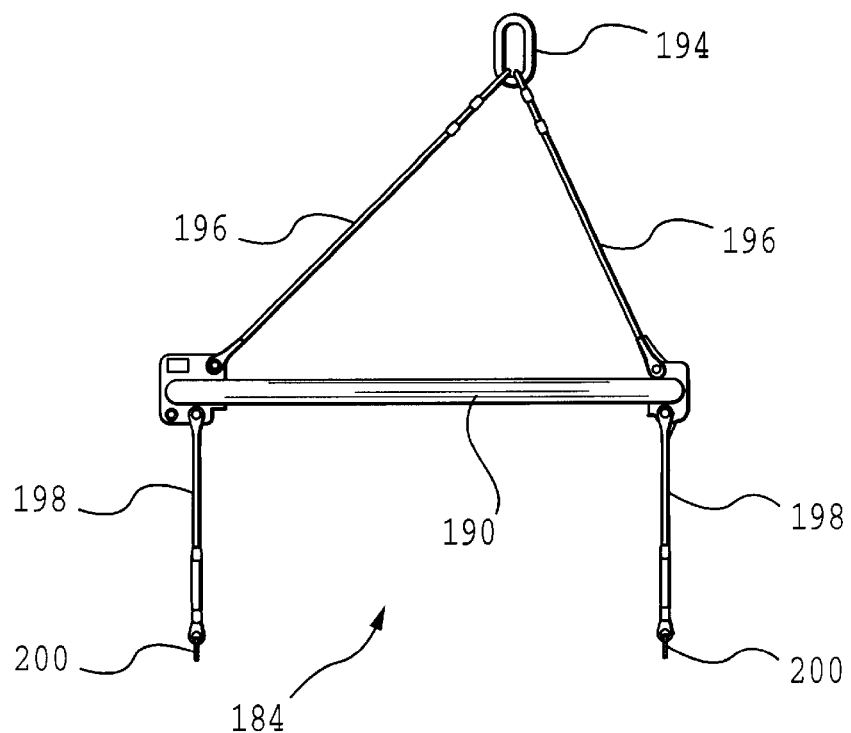
FIG. 15 is a side view of a component sling used in the present invention.
Figure 16:
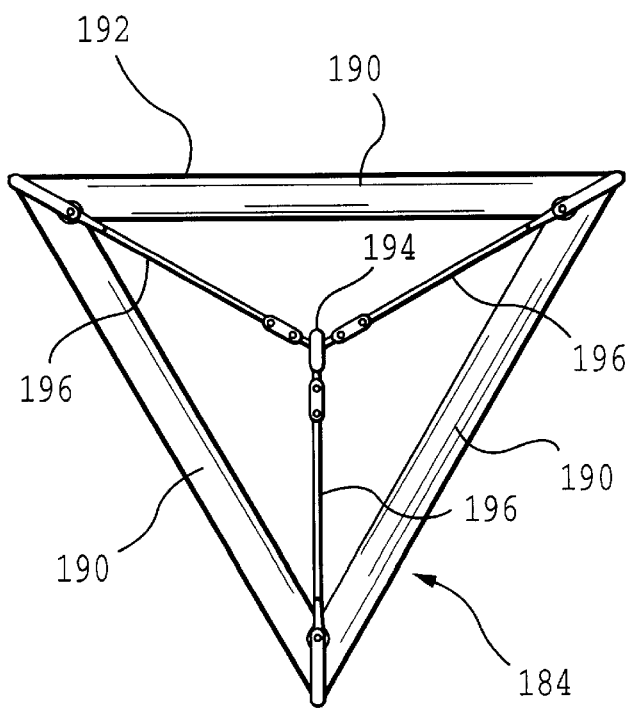
FIG. 16 is the top view of the component sling in FIG. 15.

The details of the component sling 184 are shown in FIGS. 15 and 16. FIG. 15 is a side view and FIG. 16 is a top view of the component sling 184. The component sling 184 includes three bars 190 that form a triangular support frame 192. Each vertex of the triangular support frame 192 is connected to a center ring 194 by a rope 196. A lift cable 198 is suspended from each vertex of the triangular support frame 192. Each of the lift cables 198 is attached to one of the removable bracket 186 (not shown) by a shackle 200. As shown in FIG. 14, the removable brackets 186 attach to the walls of the interstage section 14.

FIGS. 17, 18 and 19 are a front view and side views of the removable bracket 186 that connects to the interstage section 14. The removable bracket 186 includes a channel 201 along the length of its bottom section 202 for engaging the interstage section 14. Shown in FIGS. 18 and 19, the removable bracket 186 further includes a pair of openings 204 that are located on opposite sides of a central axis 206 and near the bottom section 202. The removable bracket 186 also includes an opening 207 on a top section 208 for engaging the shackle 200. A pin 210 is used to fasten the shackle 200 to the removable bracket 186. Furthermore, T pins 212 are used to fasten the removable bracket 186 to the interstage section 14.

The top rim 214 of the interstage section 14 engages the channel 201. Thereafter, T pins 212 engage openings 204 and the corresponding openings formed on the rim 214 to connect the removable bracket 186 to the interstage section 14. The number of removable brackets 186 used in the process of lifting the interstage section 14 depends on the number of lift cables that the component sling has. The component sling 184 (FIGS. 15, 16) includes three lift cables, therefore three removable brackets 186 are used in the present invention.

The details of the build up stand 188 are described with reference to FIG. 20 which is a front view of a buildup stand 188 used in the present invention. It is an steel assembly that includes an upper ring section 220, a lower hexagonal section 222, support legs 224, and guide brackets 226. In the embodiment shown in FIG. 21, preferably, six support legs 224 and six guide brackets 226 are utilized. The support legs 224 are attached between the upper ring 270 and the lower hexagonal section 222. The guide brackets 226 are bolted to the upper ring section 70 and are used to properly position a section—(the interstage section in this case) on the buildup stand 188.

Figure 21:
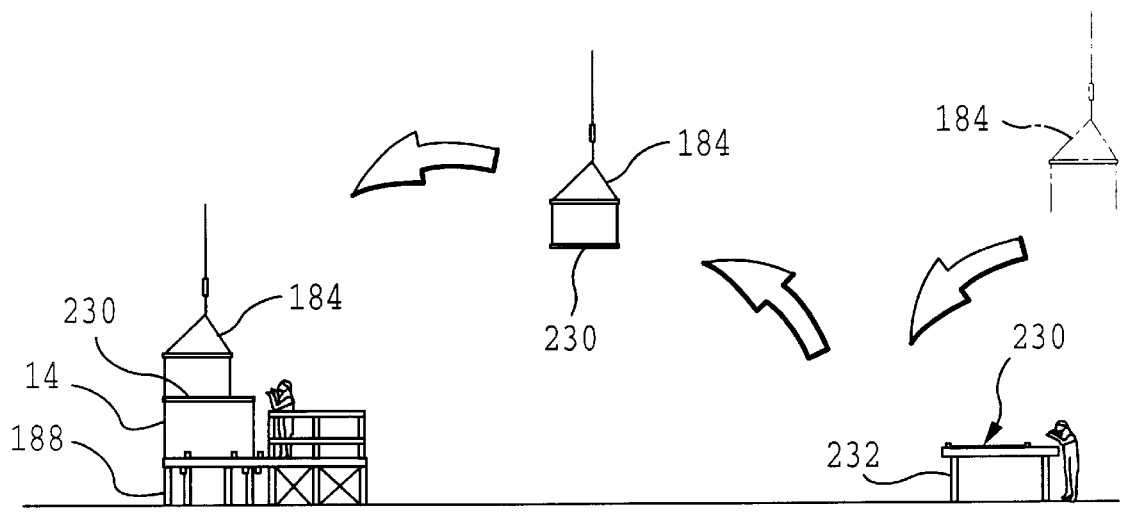
FIG. 21 is a schematic representation of the step in FIG. 13, in which the installation tray is lifted and placed on the interstage section.
Figure 22:
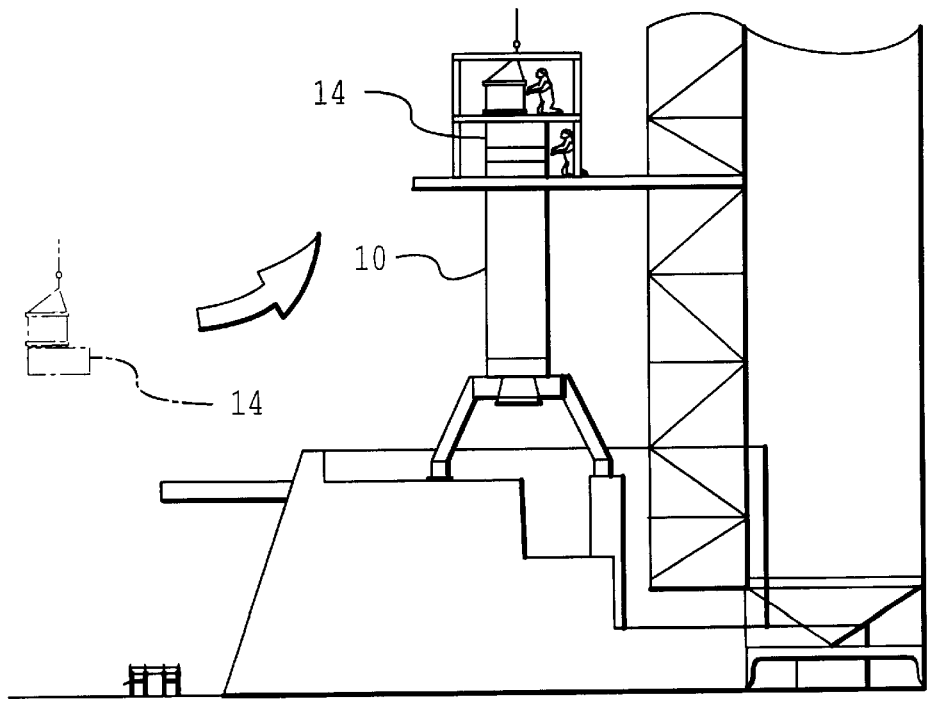
FIG. 22 is a schematic representation of the step in FIG. 13, in which the interstage section has been lifted to be placed on the first-stage motor.

The details of steps 178 and 180 are schematically shown in FIGS. 21 and 22. First, the component sling 184 picks up an installation tray 230 on a stand 232. Then, the component sling 184 is used to lift the installation tray 230 and place it on the interstage section 14. As shown in FIG. 22, the interstage section 14 and the installation tray 230 are then lifted using the component sling 184 and placed on the first-stage motor 10.

Figure 23:
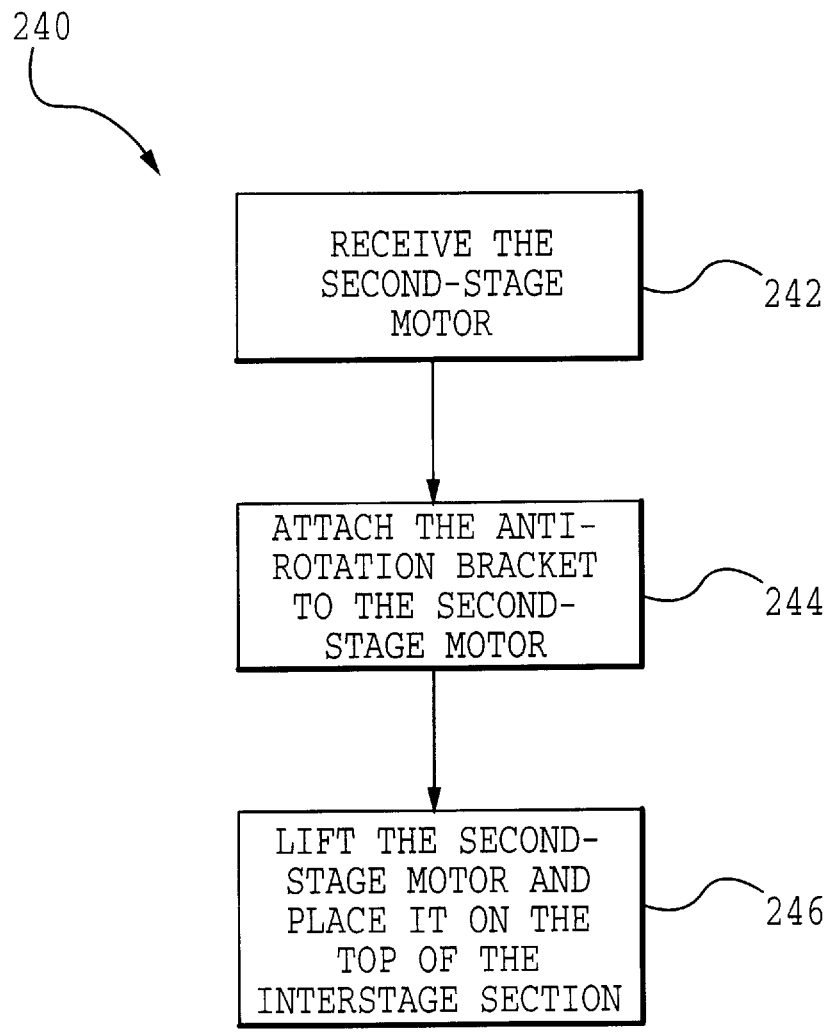
FIG. 23 is a flow chart outlining the process of preparing and positioning the second-stage motor on the interstage section.

FIG. 23 is a flow chart outlining the method of preparing a final-stage motor for mounting on the interstage section. The method in FIG. 23 is indicated generally by the reference numeral 240. The method 240 begins by receiving the final-stage motor at the launch facility in step 242. The final-stage motor is typically shipped to the launch facility by the manufacturer in a ready-to-be mounted condition. At the launch facility, an anti-rotation bracket 262 (FIG. 24) is then attached to the final-stage motor in step 244. The anti-rotation bracket prevents the final-stage motor from rotating while it is being lifted. Finally, the final-stage motor is lifted and mounted on the interstage section in step 246.

Figure 24:
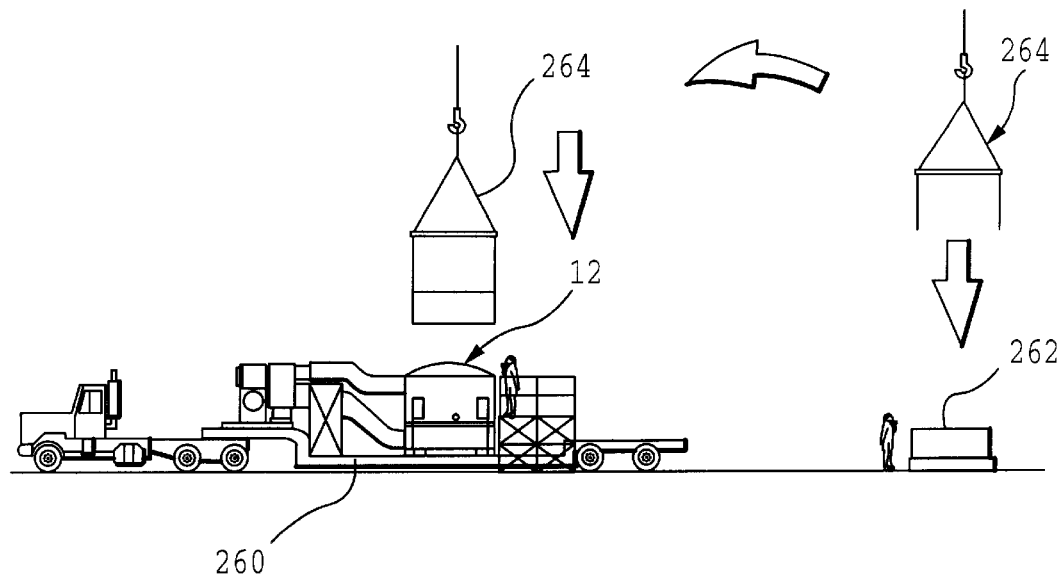
FIG. 24 is a schematic representation of a step of FIG. 23, in which an anti-rotation bracket is being attached to the second-stage motor.
Figure 25:
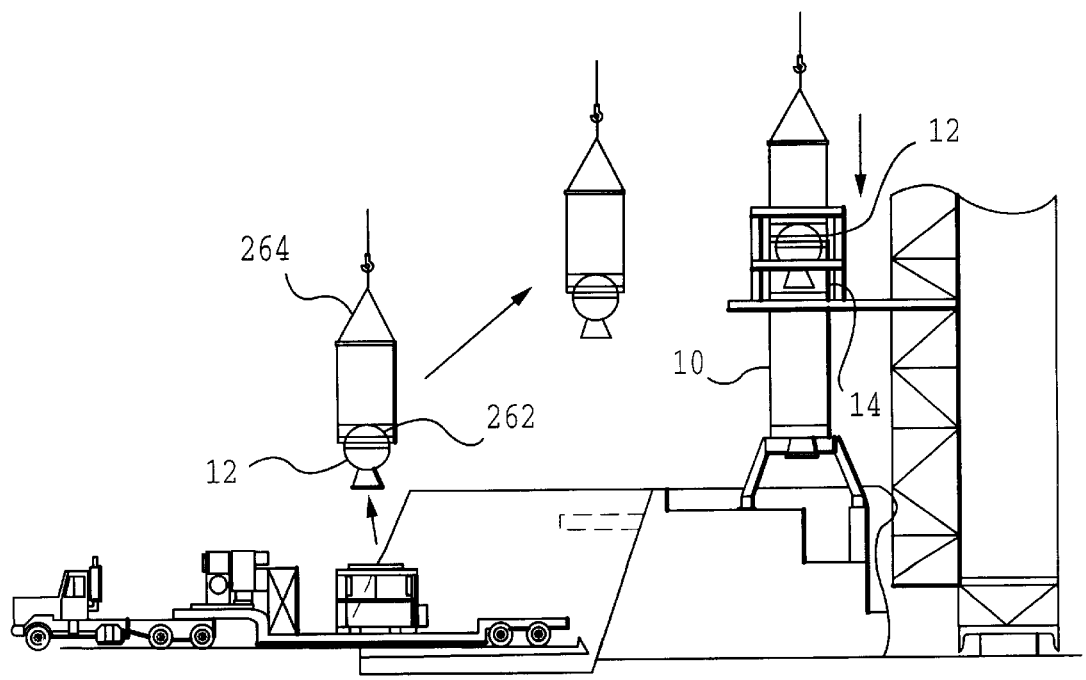
FIG. 25 is a schematic representation of a step in the flow chart of FIG. 23, in which the second-stage motor is being lifted to be placed on the interstage section.

Steps 244 and 246 are schematically shown in FIGS. 24 and 25. As shown the final-stage motor 12 is shipped to the launch facility from the manufacturer on a trailer 260. Thereafter, a anti-rotation bracket 262 is lifted using the shipping cover sling 264 and is attached to the final-stage motor 12. Then, the final stage motor 12 and the anti-rotation bracket 262 are lifted and placed on top of the interstage section 14. To augment the function of the anti-rotation bracket 262, a handling band (not shown) that attaches to the final-stage motor 12 could also be used. Once the final-stage motor 12 is mounted on the interstage section 14, the handling band is removed.

Next, the equipment section 16 must be assembled and prepared to be mounted on the final-stage motor 12. The equipment section 16 may include an attitude control section comprising the flight electronics of the launch vehicle, batteries, telemetry, and inertial measurement unit, none of which are shown. The equipment section 16 further includes a liquid monopropellant hydrazine propulsion system which has a plurality of rocket engine thrusters for pitch, roll, yaw and velocity control to correct for any errors induced during the solid rocket motor boost flight. In the present embodiment ten thrusters are preferably provided. The equipment section 16 may be configured with 2, 4, or 6 hydrazine tanks so that the propellant load may be tailored to a specific mission.

Figure 26:
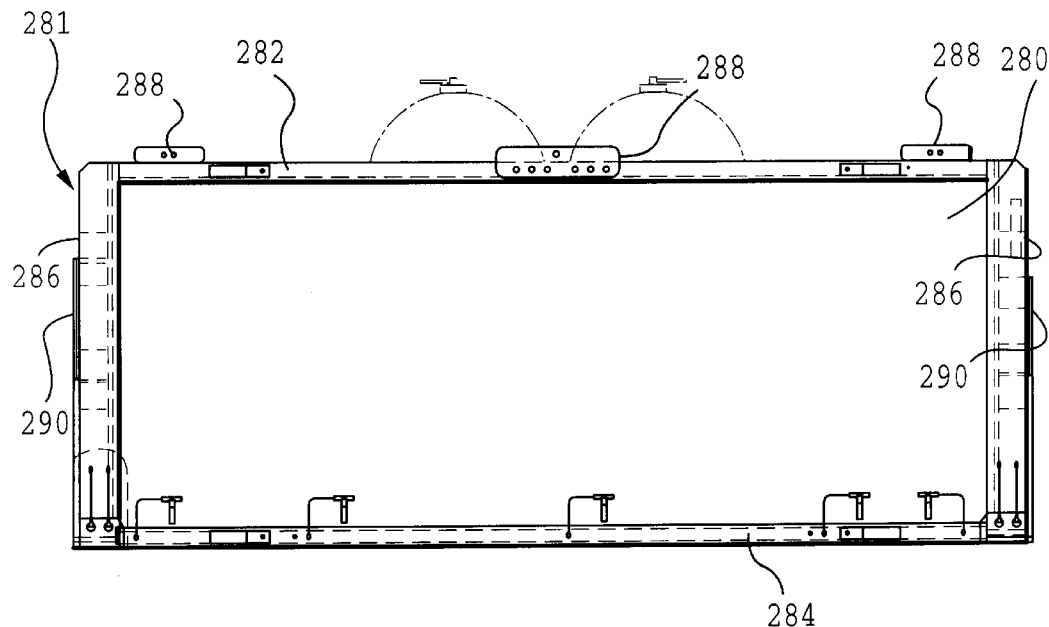
FIG. 26 is a front view of a rotation fixture used to manufacture an equipment section.
Figure 27:
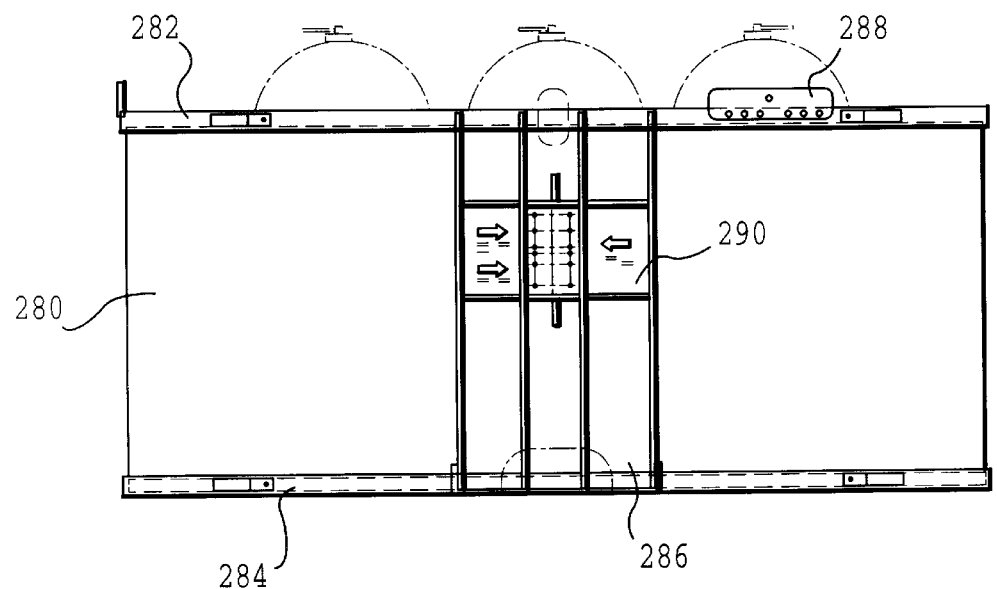
FIG. 27 is a side view of the rotation fixture in FIG. 26.

The above components of the equipment section are assembled in a cylindrical outer shell 280 (shown in FIGS. 26 and 27). The cylindrical outer shell 280 includes a flange (not shown) that is attached to its upper end. The flange facilitates the process of connecting the equipment section 16 to a shroud assembly.

The process of manufacturing the equipment section can be divided into two steps. The first step includes the process of assembling the hydrazine propulsion system and the second step includes the process of adding the flight electronics, batteries, telemetry, and inertial measurement unit to the equipment section 16.

A rotation fixture 281 is secured to the equipment section 16 as shown in FIG. 26 and is used during the first assembly step. The rotation fixture 281 provides the capability of rotating the outer shell 280 of the equipment section 16 during the installation of the hydrazine propulsion system. FIGS. 26 and 27 are front and side views, respectively, of the rotation fixture 281 that is attached to the outer shell 280 of the equipment section. The rotation fixture 281 includes a top ring 282, a bottom ring 284, a pair of curved stands 286, and brackets 288 that are attached to the top ring 282. The bottom ring 284 includes fastening pins 290 for connecting it to the base of equipment section 16.

Once the propulsion system is assembled, the bottom ring 284 and the curved stands 286 are removed. However, the top ring 282 remains attached to the equipment section 16 to further facilitate its transportation during a final processing stage. Once the equipment section 16 is assembled, it is shipped to the launch facility for final preparation before being mounted on the final-stage motor.

Figure 28:
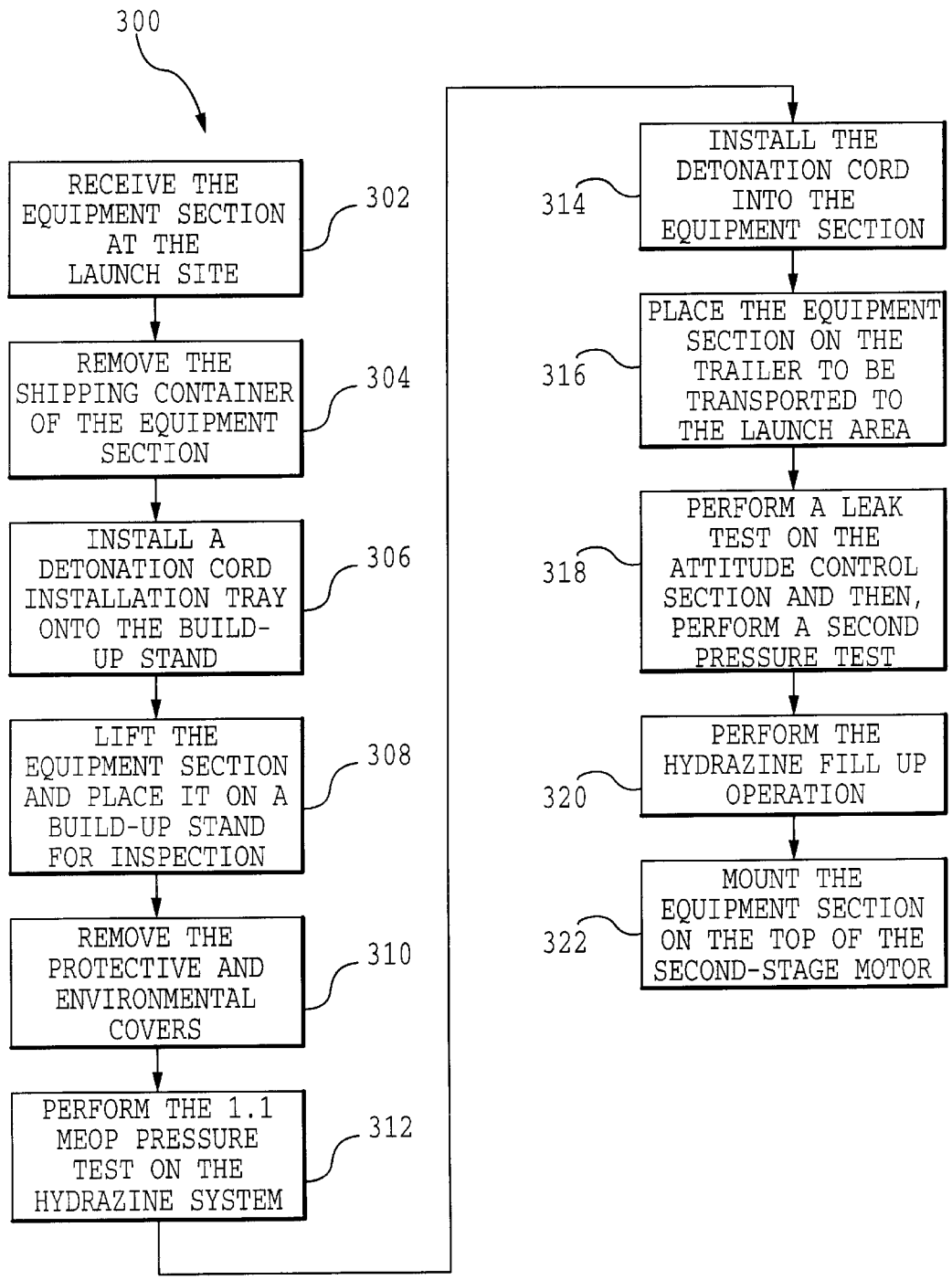
FIG. 28 is a flow chart outlining the process of preparing the equipment section to be mounted on the second-stage motor.

FIG. 28 is a flow chart outlining the steps for preparing the equipment section to be mounted on the final-stage motor. The steps in FIG. 28 are indicated generally by reference numeral 300. First, the equipment section 16 is received on a trailer at the launch facility (step 302). Next, its shipping container is removed and the equipment section is visually examined for any possible damages (step 304). In step 306, a detonation cord installation tray is installed on a buildup stand which is located next to the trailer. The equipment section is then placed on the buildup stand with the detonation cord installation tray attached to its base (step 308). Since the equipment section includes sensitive electronics and hydrazine propulsion systems, protective and environmental covers are used to protect these components. In step 310, the protective and environmental covers are removed to gain access to the inside of equipment section. Thereafter, a pressure test is performed on the hydrazine system (step 312). Next, a detonation cord assembly is installed in the equipment section (step 314). The detonation cord assembly provides the necessary explosive to separate the final-stage motor from the equipment section at the appropriate stage of the flight.

In step 316, the equipment section 16 is then placed on a trailer to be transported to the launch area. At the launch site, the attitude control portion of the equipment section is tested for any leaks using liquid nitrogen. Thereafter, a second pressure test is performed on the equipment section. At the conclusion of the above tests, the hydrazine tanks are filled with the hydrazine fuel, and the equipment section 16 is pressurized to the flight pressure condition (step 320). Next, the equipment section 16 is lifted using the component sling and mounted on the final-stage motor (step 322).

FIGS. 29–36 illustrate the various tools and steps used when mounting the equipment section on the final-stage motor. The protective and environmental covers could be placed back on the equipment section after step 310. However, this step is optional and need not necessarily be performed. If this step is performed, the environmental and protective cover must be removed once the equipment section is mounted on the final-stage motor.

Figure 29:
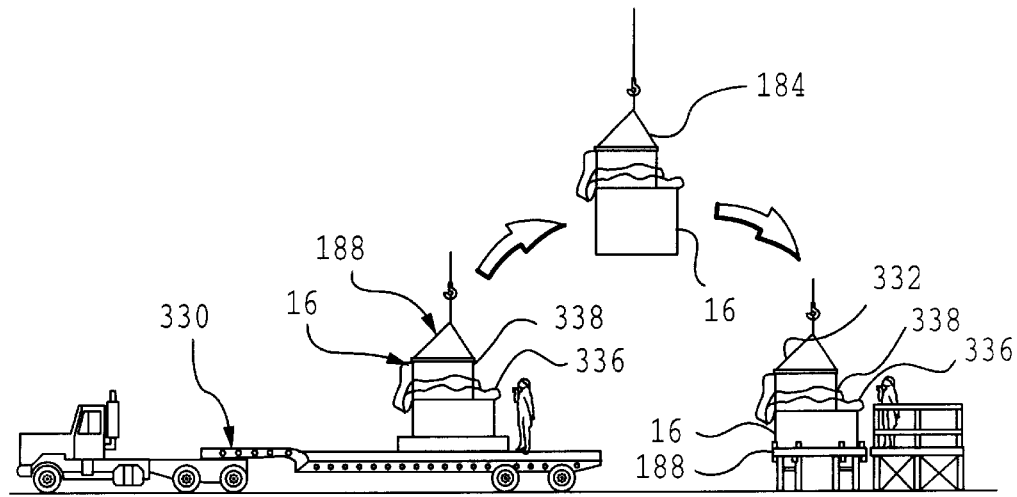
FIG. 29 is a schematic representation of a step of lifting the equipment section off the trailer and placing it on a buildup stand.

The details of step 308 are schematically shown in FIG. 29. The equipment section 16 is shipped on a trailer 330, picked up by the component sling 184, and placed on the buildup stand 188. The equipment section 16 includes a protective cover 336 and an environmental cover 338.

Figure 30:
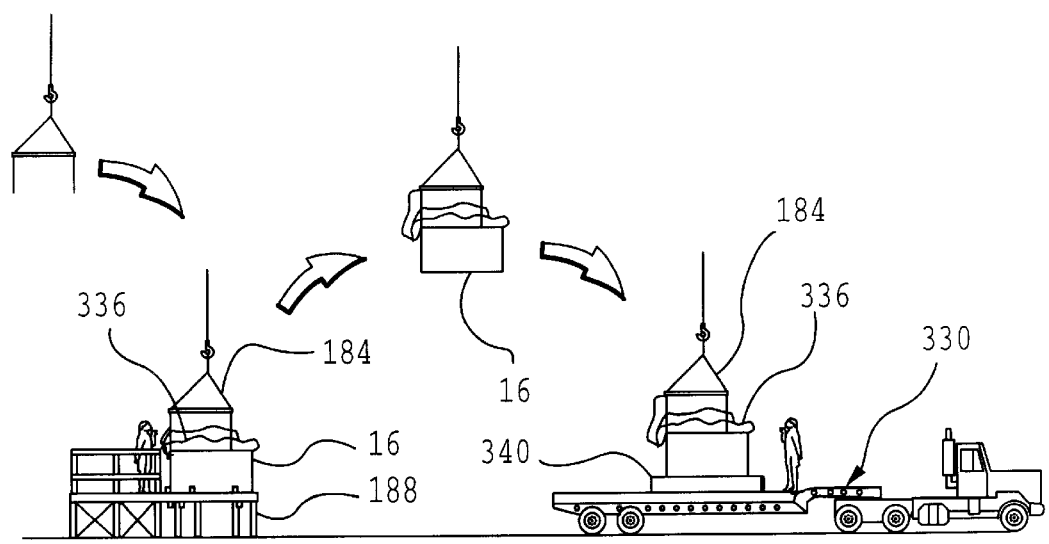
FIG. 30 is a schematic representation of a step in which the equipment section is lifted off the buildup stand and placed on a trailer to be transported to the launch area.
Figure 31:
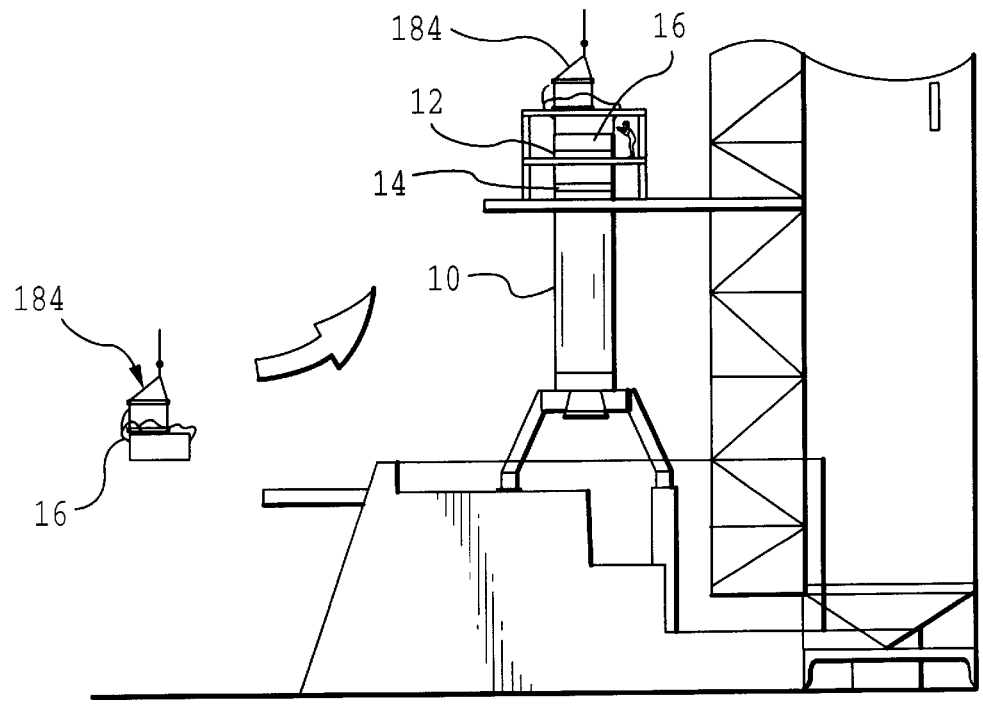
FIG. 31 is a schematic representation of the step in which the equipment section is lifted and placed on the second-stage motor.

The details of step 316 are schematically shown in FIG. 30. The equipment section 16, after the pressure test, is lifted from the build-up stand 188 with the component sling 184 and placed on top of a transportation assembly 340 on a trailer 330 to transport to the launch site. The protective cover 336 and the environmental cover 338 have been placed back on the equipment section 16. As shown in FIG. 31, at the launch site, the equipment section 16 is lifted off the trailer using the component sling 184 and is mounted on the final stage motor 12. The transportation assembly 340 is more clearly described in FIGS. 32 and 33.

Figure 33:
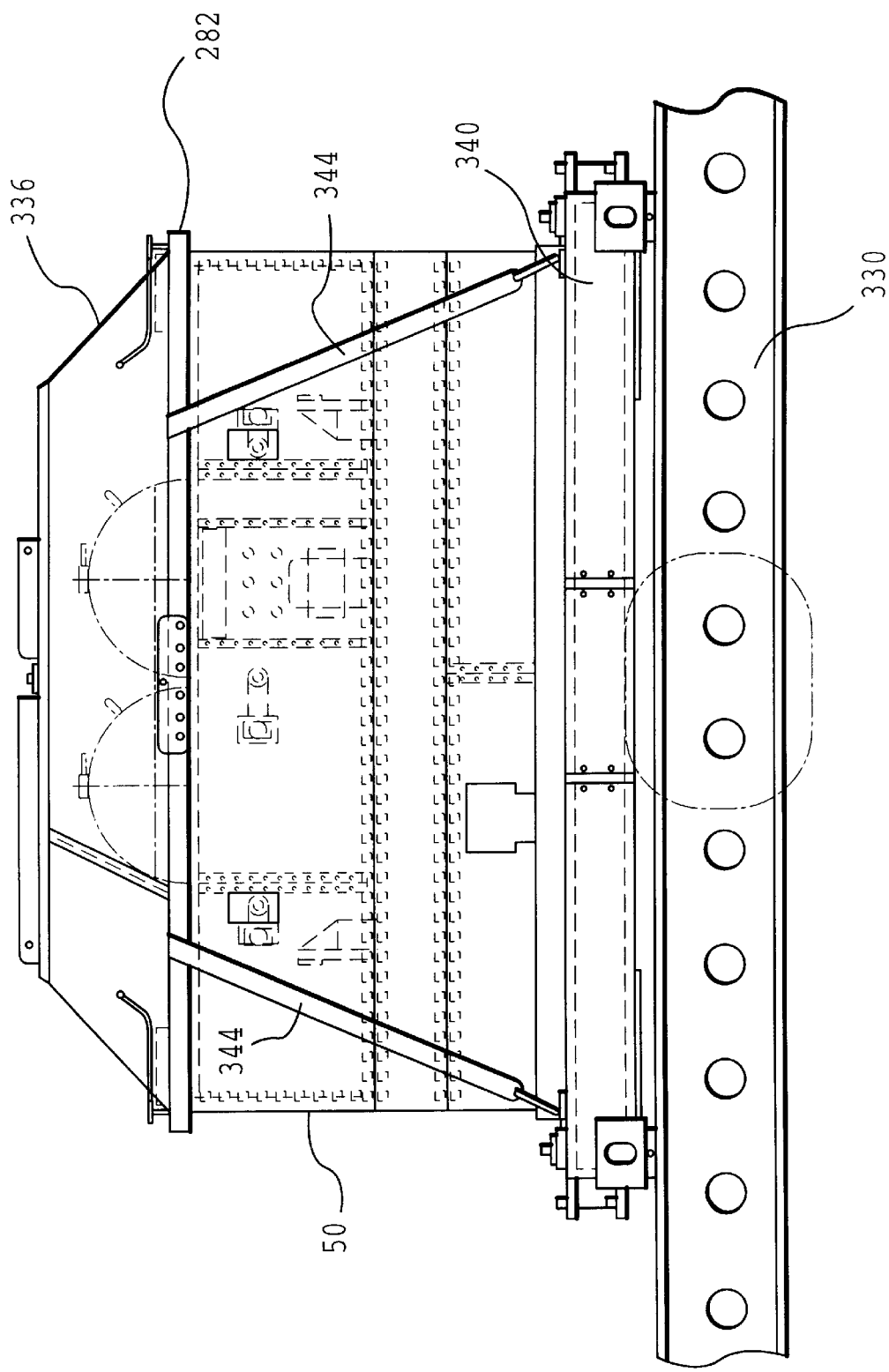
FIG. 33 is a side view of the equipment section placed on the transportation assembly.
Figure 34:
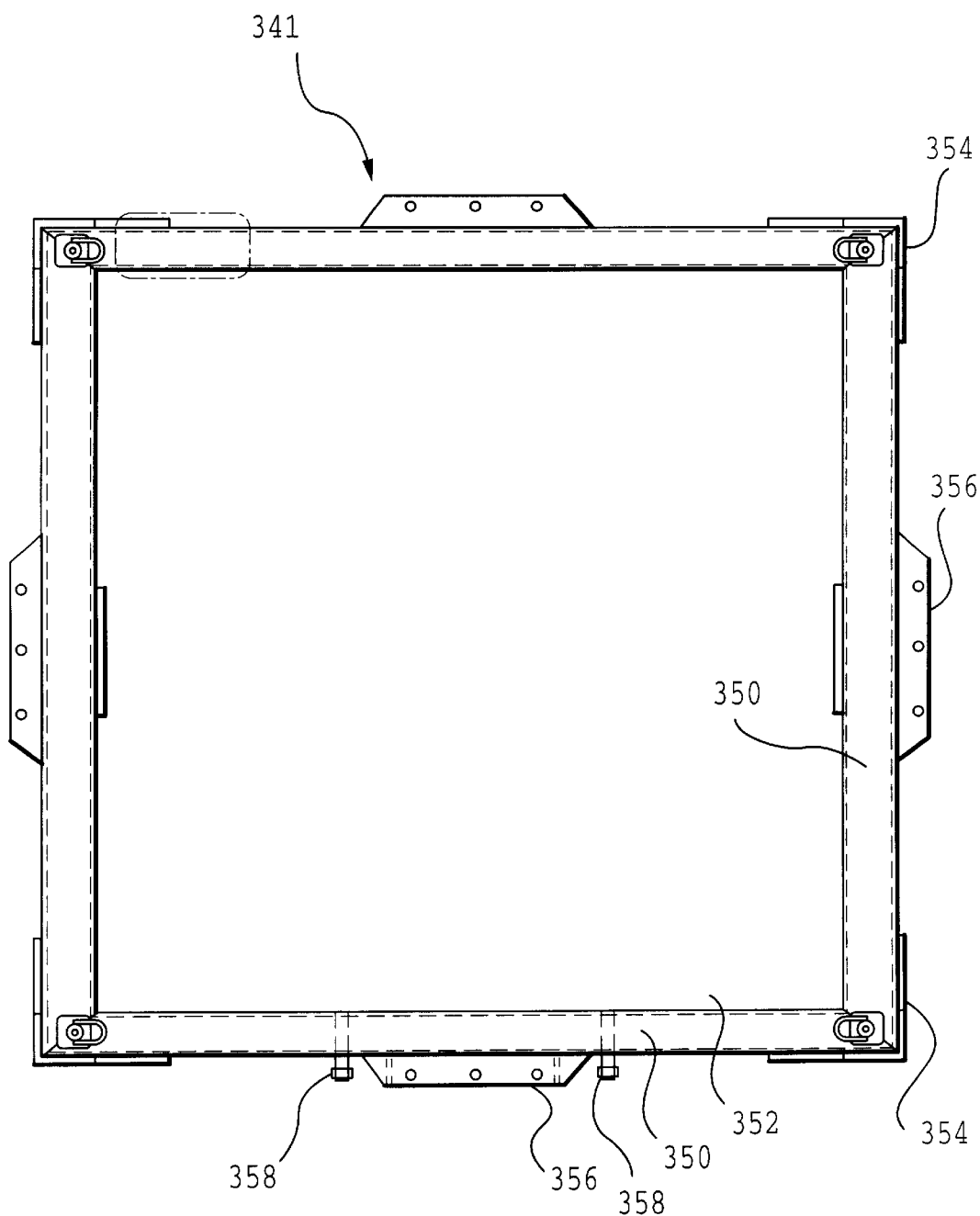
FIG. 34 is a top view of a transportation stand used in the present invention.
Figure 35:
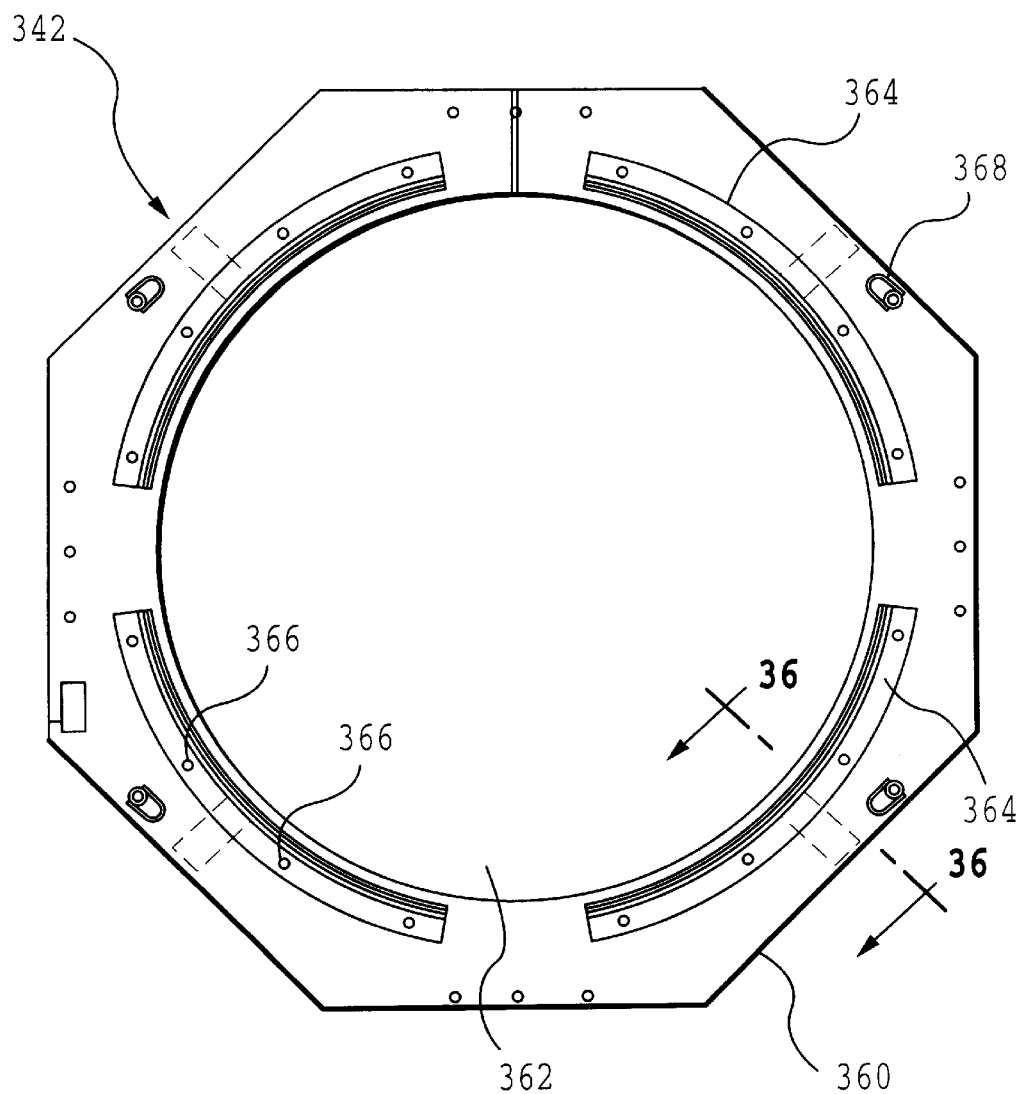
FIG. 35 is a top view of an equipment section transportation adapter used in the present invention.

FIGS. 32 and 33 are top and side views, respectively, of the equipment section 16 mounted on the equipment section transportation assembly 340. The equipment section transportation assembly 340 includes a transportation stand 341, which is shown in FIG. 34, and an equipment section transportation adapter 342, which is shown in FIG. 35. The equipment section 16 is strapped to the transportation assembly 340 by the means of tie-down straps 344. Tie-down straps 344 are attached between the top ring 282 and the transportation adapter 342. This is done to secure the equipment section 16 in position while it is being transported.

FIG. 34 is a top view of the transportation stand 341. The transportation stand 341 includes four structural tubes 350 that are attached to a sloping center plate 352. Each structural tube 350 includes a connecting plate 356 attached to its center to enable the attachment of the transportation adapter 342 to the transportation stand 341. An iso-corner fitting 354 is attached to each corner of transportation stand 341 to further reinforce the structure of the transportation stand 341. The transportation stand 341 further includes at least two drain plugs 358 which are attached to the center plate 352.

The transportation stand 341 is designed to withstand about 15,000 lbs. of static weight. The sloping plate 352 is provided to capture hydrazine fuel that may leak out of the hydrazine tanks while the equipment section 16 is being transported to the launch site. This is done to ensure the safety of the people who are handling the equipment section 16 since the hydrazine fuel is toxic. The drain plugs 358 are provided to drain the collected hydrazine fuel once the equipment section has been lifted off the transportation assembly 340.

A transportation adapter 342 is mounted on the transportation stand 341. FIG. 35 is a top view of the equipment section transportation adapter 342. The equipment section transportation adapter 342 includes a hexagonal steel plate 360 with a circular opening 362. The diameter of the circular opening 362 is smaller than the diameter of equipment section 16. Four guide brackets 364 are placed around the perimeter of the circular opening 362. Each bracket is arc-shaped and is attached to the steel plate 360 by means of bolts 366. The equipment section transportation adapter 342 further includes a plurality of shackles 368 that are connected to the steel plate 360 and are positioned around the perimeter of circular opening 362.

Figure 36:
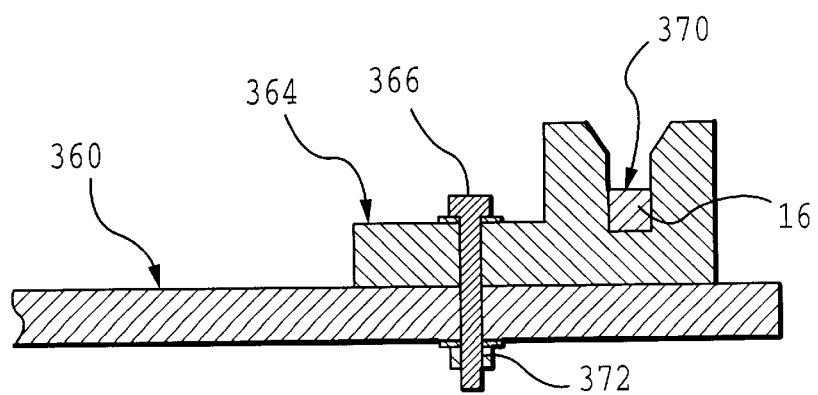
FIG. 36 is a cross-sectional view of a typical guide bracket attached to the equipment section transportation adapter.

FIG. 36 is a cross sectional view of the guide bracket 364 taken along the line A—A in FIG. 35. The bracket 364 includes a channel 370 that receives the bottom rim of the equipment section 16. The function of the channel 370 is two-fold. First, it provides a guide for the proper placement of the equipment section 16 on the transportation adapter 342. Second, it secures the equipment section 16 in position during its transportation.

Figure 37:
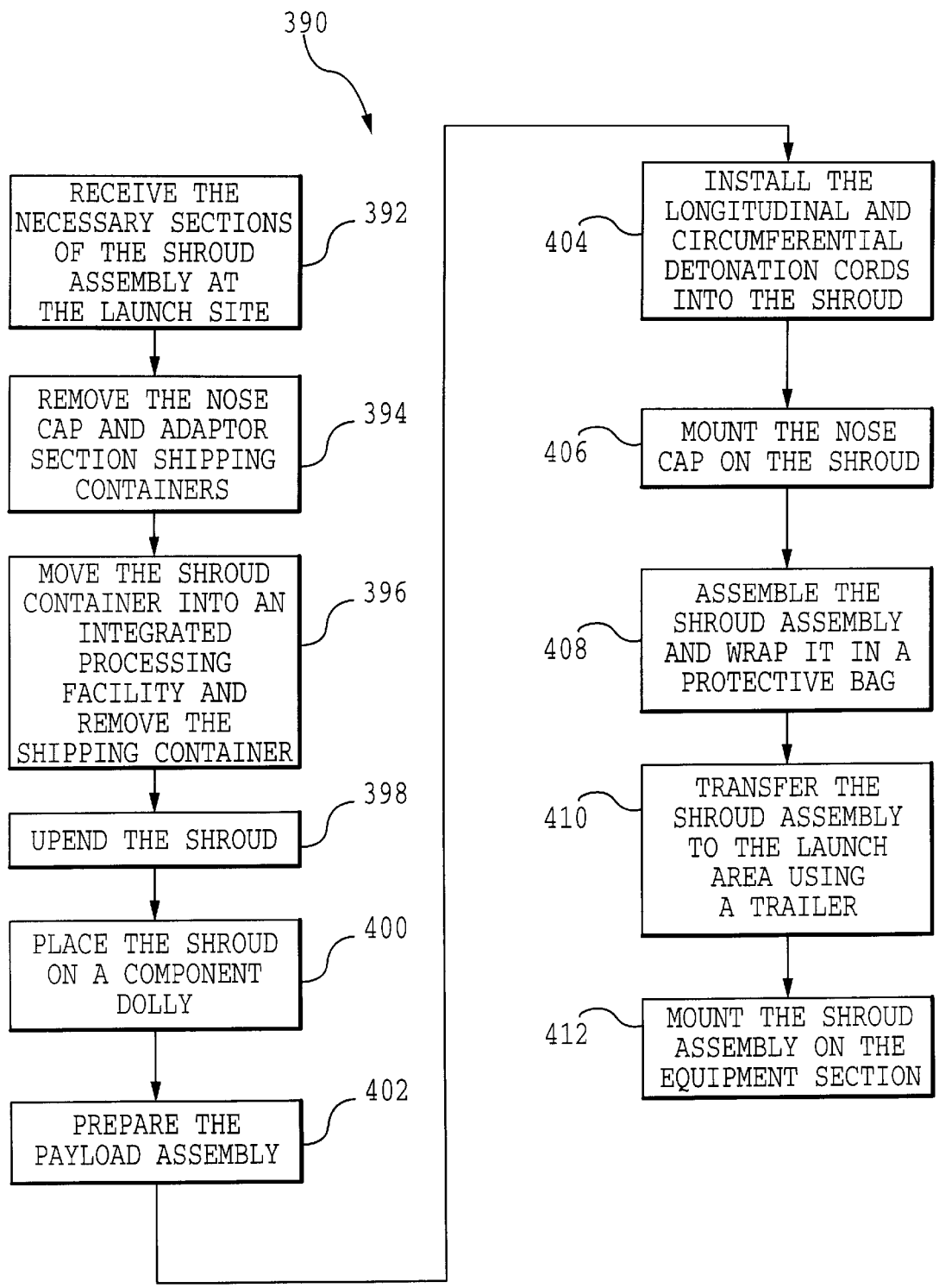
FIG. 37 is a flow chart outlining the process of preparing and positioning the shroud assembly on the equipment section.

The final assembly stage of the launch vehicle includes the steps of preparing the shroud assembly to be mounted on the equipment section. FIG. 37 is a flowchart showing the method, which are indicated generally by reference numeral 390. The assembly of the shroud assembly, as shown in FIG. 4, can be carried out simultaneously with the assembly of the remainder of the launch vehicle. First, the components of the shroud assembly are received at the launch facility (step 392). The components of the shroud assembly include a shroud, a nose cap, an adapter section, and a payload. Generally the payload is shipped separately by the manufacturer to the launch site. Once at the launch facility, the payload is kept in a clean-room environment to protect its sensitive parts. The shroud, the nose cap, and the adapter are housed in separate shipping container and shipped to the launch facility separately.

Next, the nose cap shipping container and the adapter shipping container are removed from the trailer and stored for later use (step 394). Thereafter, the trailer and the shroud shipping container are moved into an integrated processing facility (step 396). Next, the shroud shipping container is removed, exposing a shroud which is placed on a shroud skid and the shroud is then upended using a specially designed shroud sling (step 398). The shroud is then lifted and placed on a component dolly (step 400).

Next, in step 402, the payload assembly is prepared to be assembled with the shroud. This step involves the transportation of the adapter section to the clean-room to be placed on a buildup stand and the mounting of the payload on the adaptor.

Thereafter, In step 404, longitudinal and circumferential detonation cords are installed into the shroud. The shroud is typically formed of detachable sections that separate before the payload is deployed into orbit. The longitudinal and circumferential detonation cords provide the explosives necessary to break the connection between the sections of the shroud to separate them.

After the installation of the longitudinal and circumferential detonation cords, the nose cap is mounted on the shroud (step 406). The resulting assembly is then moved to the clean-room and placed on the payload assembly (step 408). The shroud, which is a hollow shell, encapsulates the payload with the adaptor section sealing the open end of the shroud. The shroud assembly 52 is then wrapped in a protective bag (step 408) and transferred to the launch site (step 410). Finally, the shroud assembly is mounted on the equipment section in step 412. The various tools and substeps of method 390 are shown in FIGS. 38–56.

Figure 38:
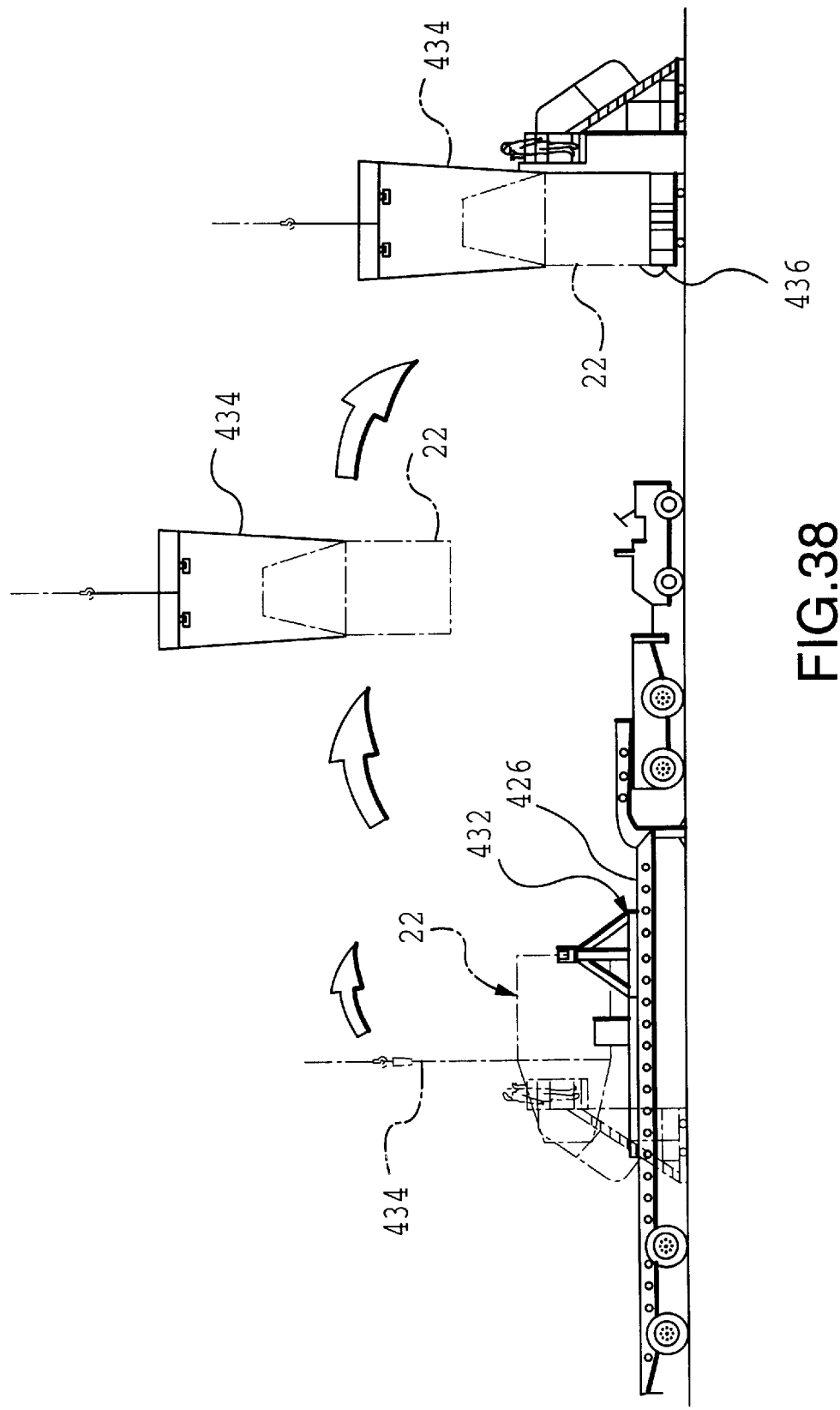
FIG. 38 is a schematic representation of the steps in FIG. 37, in which the shroud is upended and is lifted to be placed on a component dolly.

The details of steps 398 and 400 are schematically shown in FIG. 38. A trailer 426 has a shroud 22 mounted horizontally on a shroud skid 432. A shroud sling 434 is used to move the shroud to a component dolly 436. The shroud sling 434 and an aft bar (see FIGS. 46, 47) are connected to opposite sides of the shroud 20 to upend it. The other end of the shroud sling 434 is attached to a crane (not shown). Once the shroud 22 is upended, it is lifted off trailer 426 and placed vertically on the component dolly 436.

Figure 39:
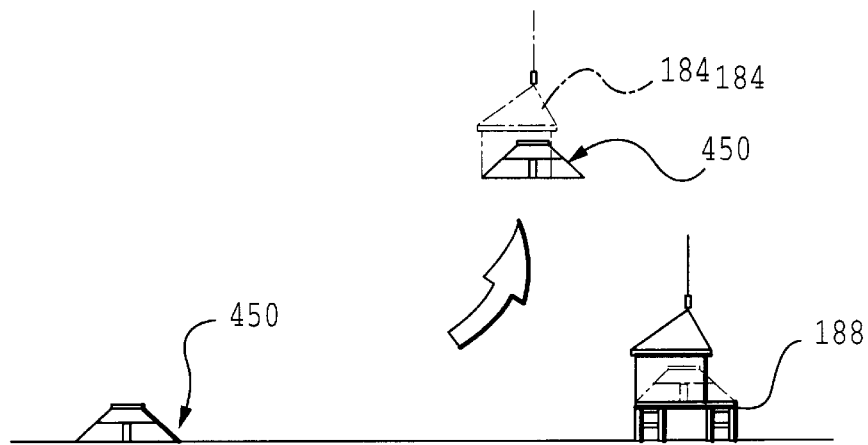
FIG. 39 is a schematic representation of the step in which the adapter section is placed on a buildup stand.
Figure 40:
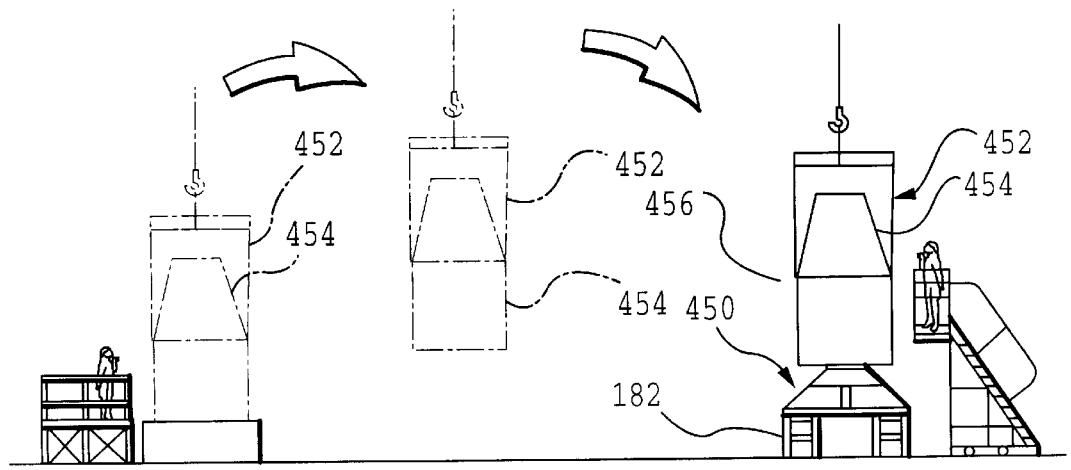
FIG. 40 is a schematic representation of the step in which the payload is placed on the adapter section.

The details of step 402 are schematically shown in FIGS. 39 and 40. The component sling 184 lifts an adaptor section 450 to the buildup stand 188. As shown in FIG. 40, a payload sling 452, which is connected to a 5-ton bridge crane (not shown), is used to lift a payload 454 and place it on the adaptor section 450, thereby forming a payload assembly 456.

Figure 41:
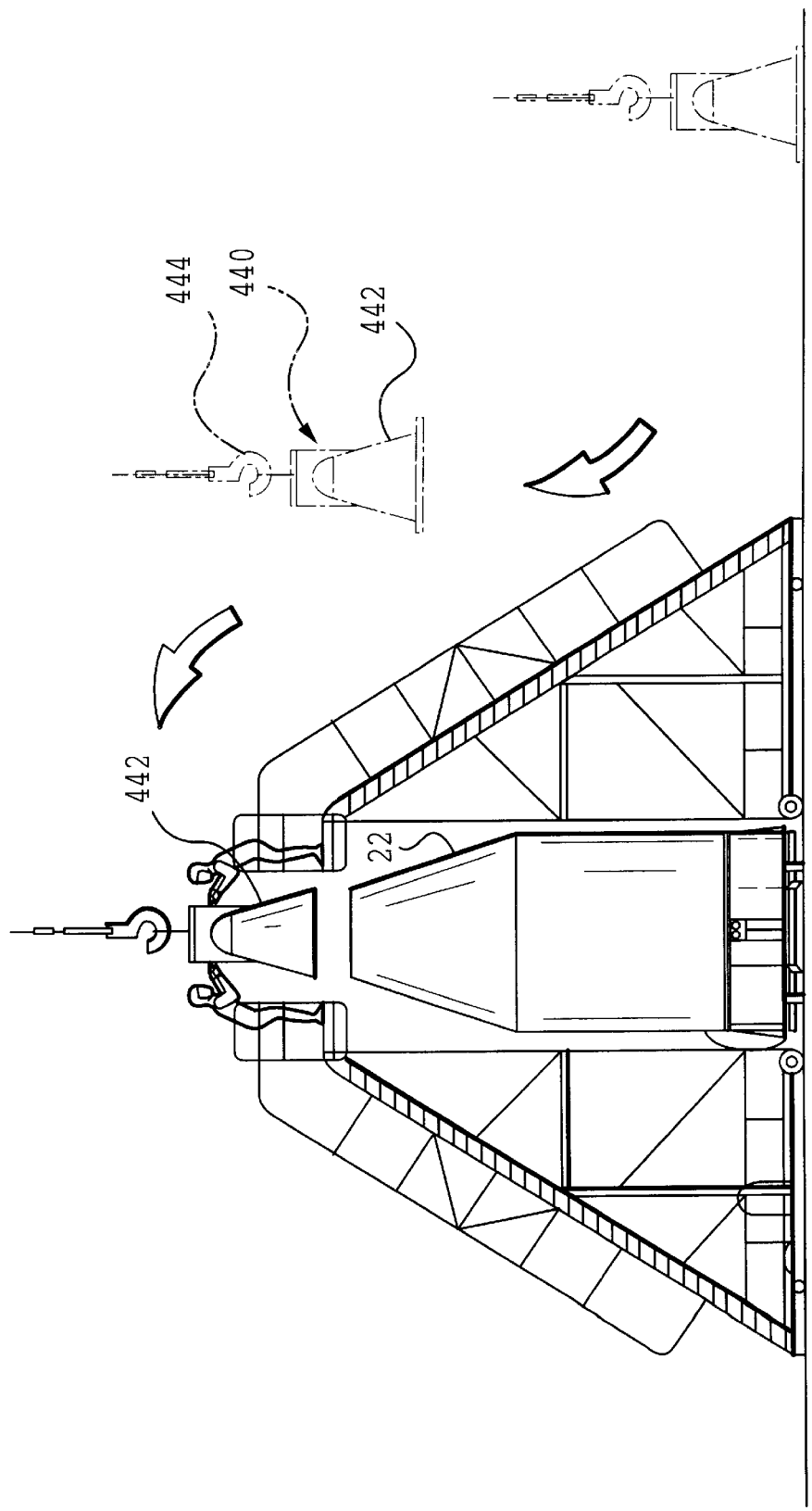
FIG. 41 is a schematic representation of the step in which the nose cap is placed on the shroud.
Figure 42:
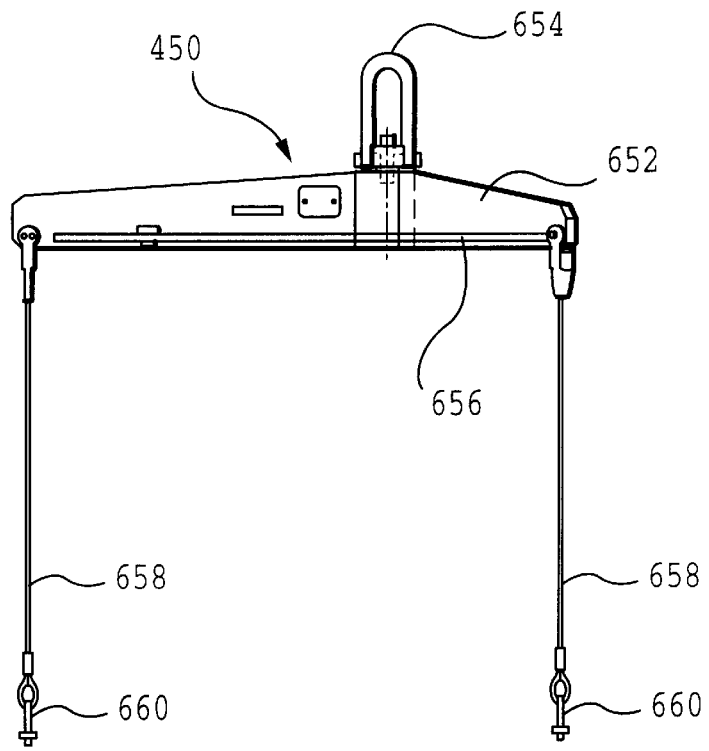
FIG. 42 is a side view of a nose sling used in the present invention.
Figure 43:
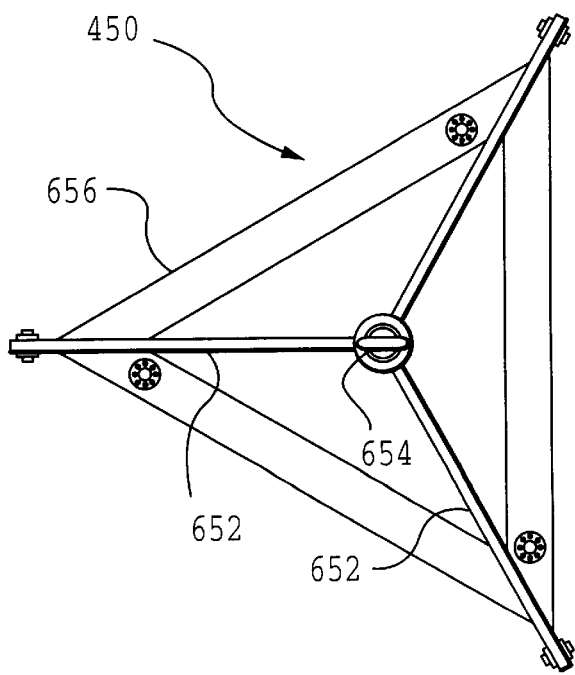
FIG. 43 is a top view of the nose sling in FIG. 42.

Step 406 is shown schematically in FIG. 41. The nose cap 442 is lifted and placed on the shroud 22 using the nose cap sling 440 that is connected to a 75-ton bridge crane (not shown) through a hook 444. FIGS. 42 and 43 are side and top views, respectively, of a nose cap sling 440. The nose cap sling 440 includes three legs 652 which are connected to a shackle 654 on one end and are connected to vertices of a triangular support plate 656 on the other end. A lifting cable 658 is suspended from each vertex of the plate 656. A hoist ring 660 is attached to the other end of each lifting cable 658. The hoist rings 660 interface with the nose cap to connect the nose cap to the nose cap sling 440. The shackle 654 interfaces with a crane (not shown).

Figure 44:
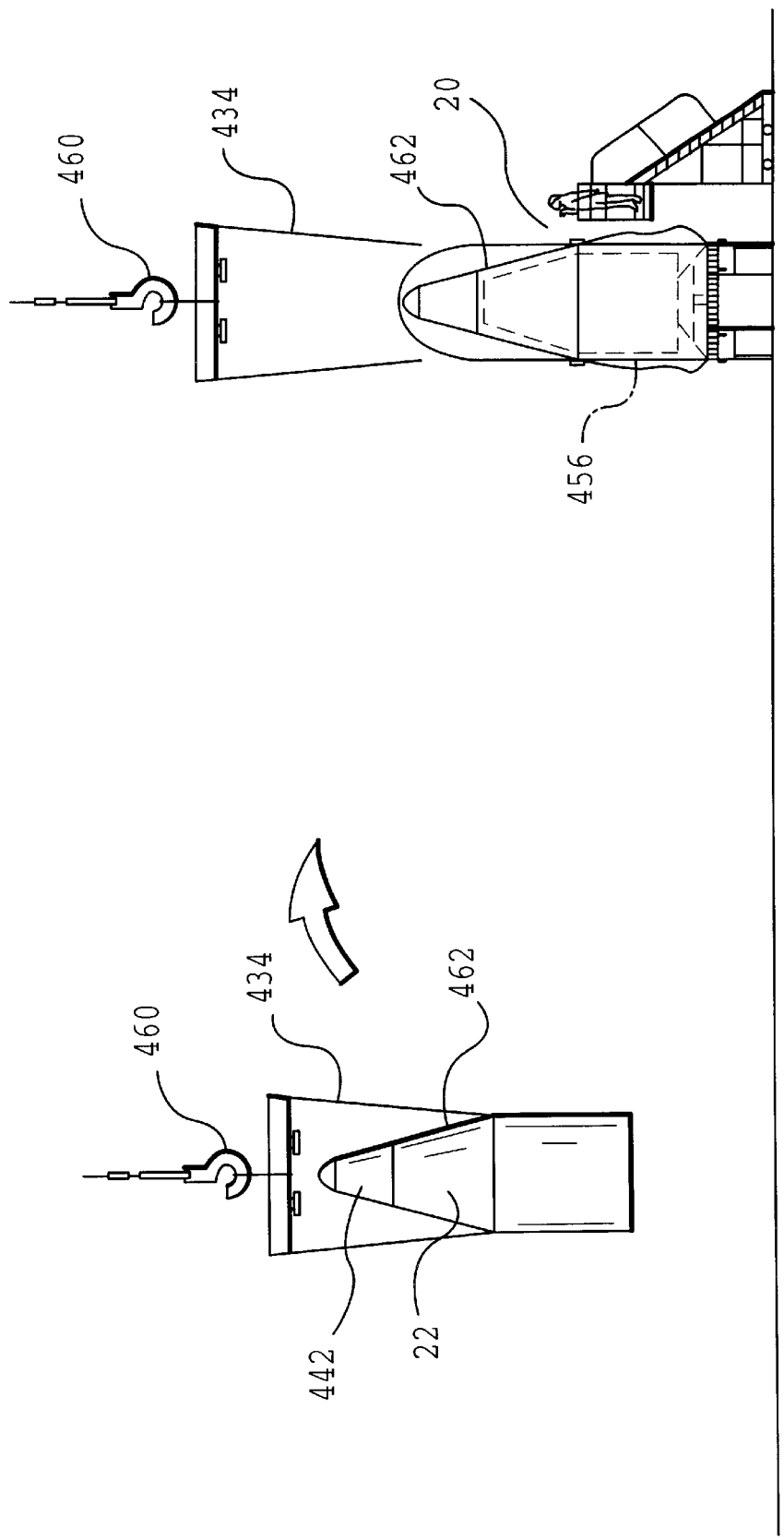
FIG. 44 is a schematic representation of the step in which the shroud is placed on the payload assembly and a protective wrap is wrapped around the shroud.

The details of steps 408 are schematically shown in FIG. 44. The shroud sling 434 (FIG. 38), which is connected to a crane (not shown) through a hook 460, is used to lift the shroud 22 and nose cap 442 assembly (FIG. 41) and place it over the payload assembly 456, thereby forming the shroud assembly 20. The shroud assembly is then wrapped in a protective cover to protect it.

Figure 45:
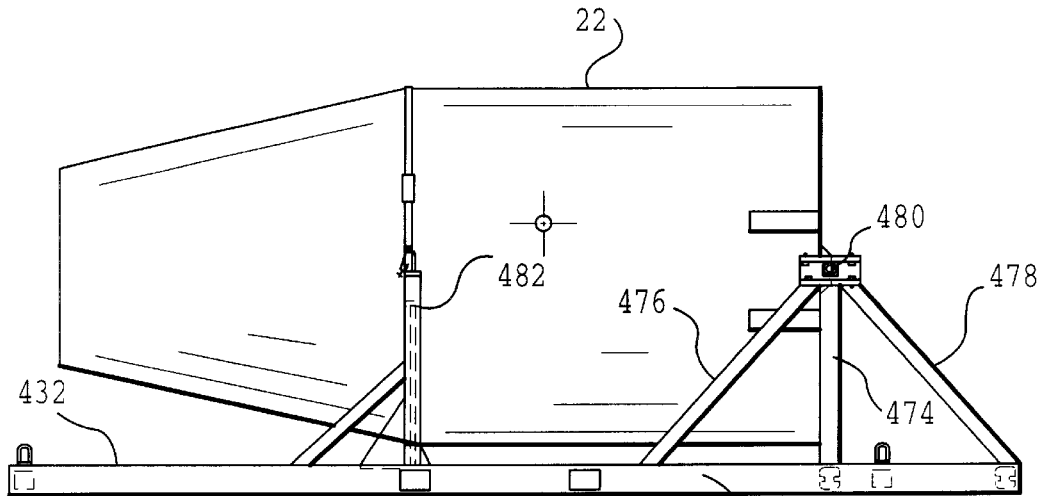
FIG. 45 is a side view of a shroud skid used in the present invention, with a shroud horizontally positioned on it.
Figure 46:
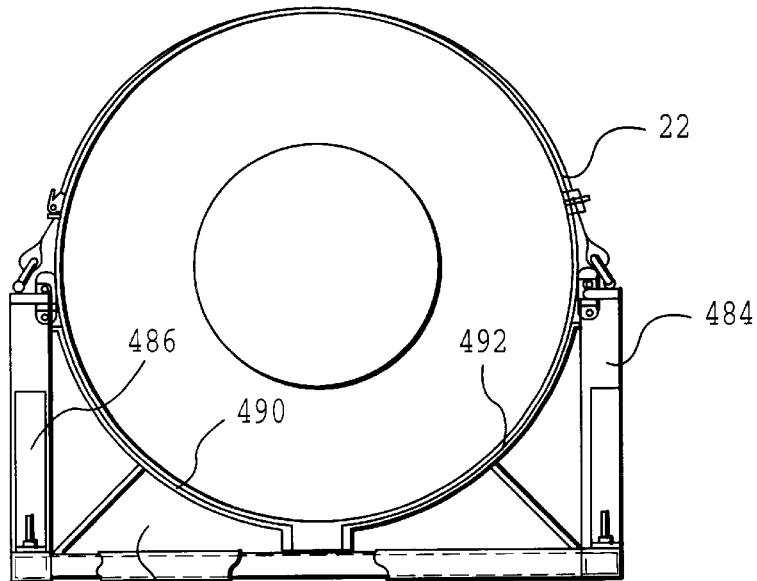
FIG. 46 is a front view of a shroud which is placed on the shroud skid.
Figure 47:
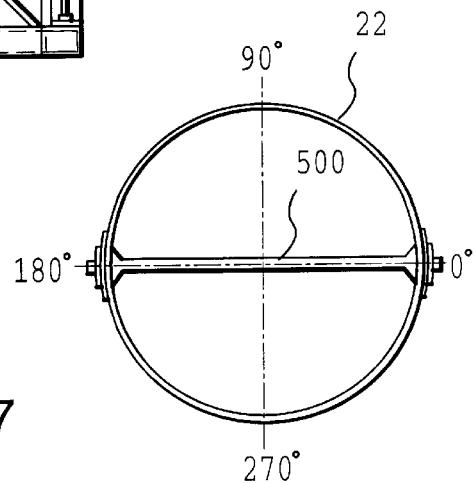
FIG. 47 is an end view of a shroud with an aft-bar attached to its base.

FIG. 45 is a side view of the shroud skid 432 with a shroud 22 horizontally positioned on the skid. The skid 432 has a base member 472. A rear support member 474 is attached to the base member 472 and has two support arms 476, 478. The upper end of the rear support member 474 has a channel 480 into which a trunnion on an aft bar (FIGS. 48, 49) fits to permit rotation of the shroud. A front support member 482 supports the front of the shroud. FIG. 46 is a front view of the skid 432 showing the front support member 482. The front support member 482 has two side support arms 484, 486 and curved support surfaces 490, 492 that support the shroud 428. FIG. 47 is an end view of the shroud 20 showing an aft bar 500 that has trunnions that sit in channel 480 to permit rotation of the shroud.

Figure 48:
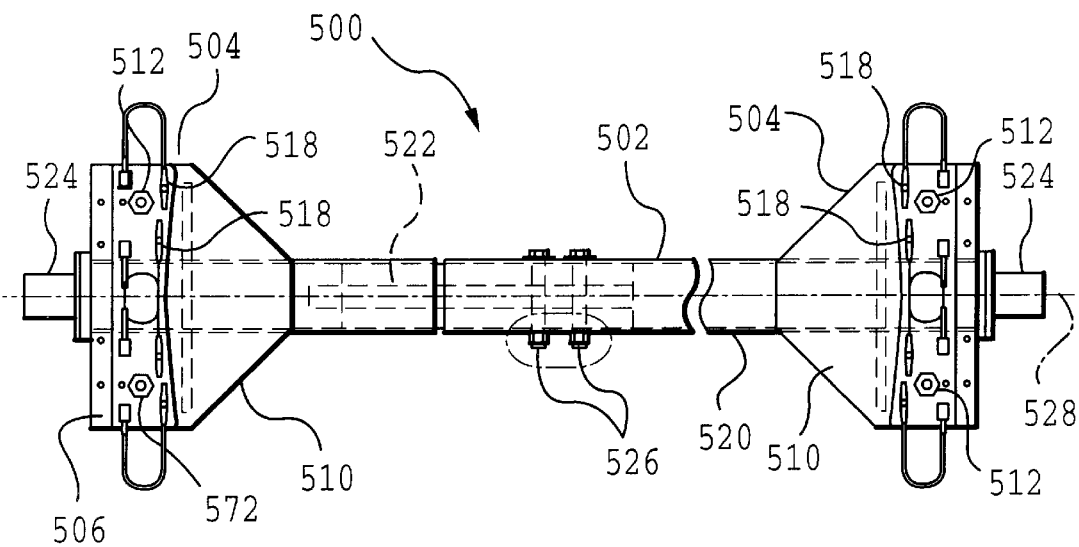
FIG. 48 is a front view of an aft-bar used in the present invention.
Figure 49:
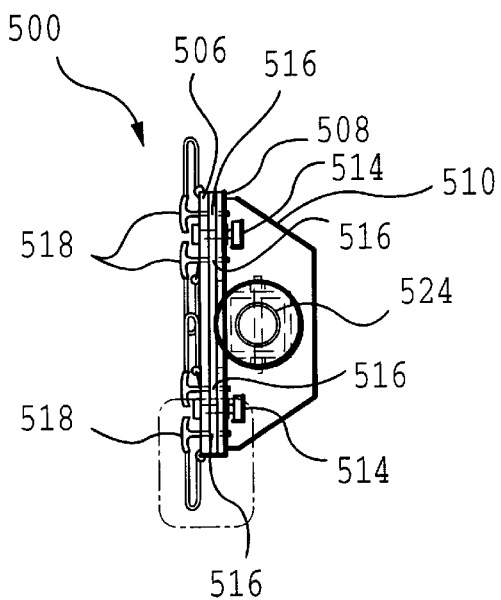
FIG. 49 is an end view of the aft bar in FIG. 48.

The details of the aft bar 500 are shown in FIGS. 48 and 49. FIG. 48 is a front view of the aft bar 500 and FIG. 49 is an end view of the aft bar 500. The aft bar 500 includes a telescoping mechanism 502 with a bracket 504 attached to its opposite ends. Each of the brackets 502 includes a base plate 506, a mating plate 508, and a stop plate 510. The base plates 506 and the mating plates 508 of each bracket 504 abut one another. The base plate 506 includes two openings 512 aligned with corresponding openings in the mating plate 508 (not shown). Bolts 514 pass through the openings 512 and the corresponding openings in the mating plate 508 to secure the plate to each other. The base plate 506 includes four openings 516 aligned with corresponding openings in the mating plate 508 (not shown). Fastening pins 518 pass through the openings 516 and the corresponding openings in the mating plate 506 to secure the brackets 504 to the shroud 428.

The telescoping mechanism 502 includes a hollow cylindrical section 520 that receives an intruding cylindrical section 522. Both the hollow section 520 and the intruding section 522 include a plurality of radial openings (not shown) formed on their respective walls. The aft bar 500 further includes trunnions 524 attached to its opposite ends and stop bolts 526. The trunnions 524 fit within channel 480 (FIG. 43) to permit rotation of the shroud to a vertical position.

Figure 50:
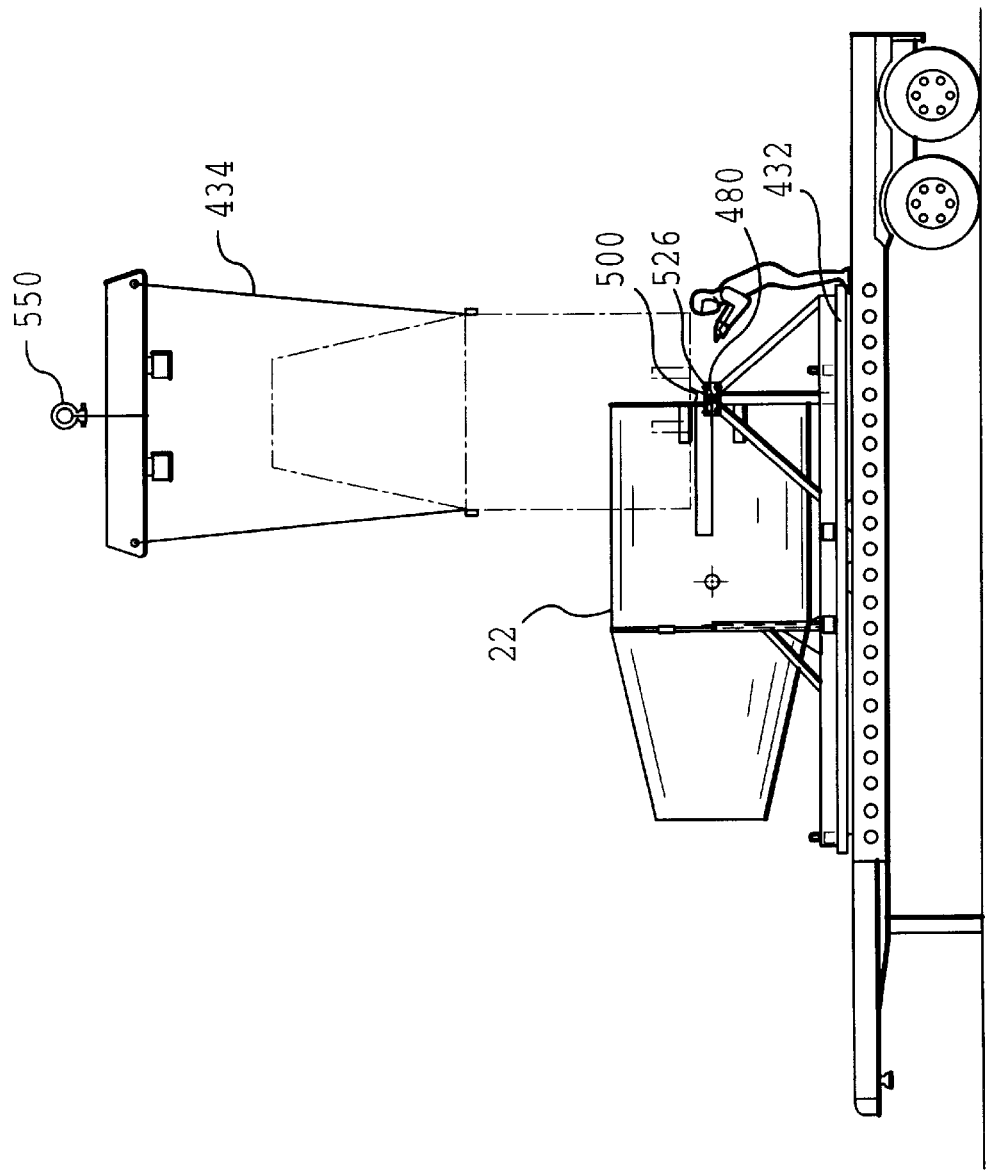
FIG. 50 is a schematic representation of the process of upending the shroud.

The step of upending the shroud is shown in FIG. 50. To upend the shroud 428, the shroud sling 434 is connected to the shroud through the lifting brackets 560. As the crane (not shown), which is connected to shackle 550, pulls up and moves to the left in FIG. 50, the front of the shroud 428 lifts up. At the same time, the trunnions 526 begin to rotate inside the channels 488 enabling the base of the shroud 428 to pivot about the axis 528 (FIG. 46) of the aft bar 500. This process continues until the shroud is upended.

To connect the aft bar 500 to the shroud 428, the intruding section 522 is adjusted such that the stop plates 510 contact the walls of the shroud 428 and the shroud flange is positioned between the base plate 506 and the mating plate 508. At this point, at least two openings formed in the wall of the hollow section 520 coincide with two openings formed in the wall of the intruding section 522. Stop bolts 526 are passed through the coinciding openings and are tightened to lock the telescoping mechanism 502.

Next, bolts 514 are tightened so that the shroud flange is tightly held between the base plate 506 and the mating plate 508 of both brackets 504. Finally, pins 518 are passed through the holes 516 and the corresponding holes of the shroud flange to further tighten the brackets 504 to the flange.

Figure 51:
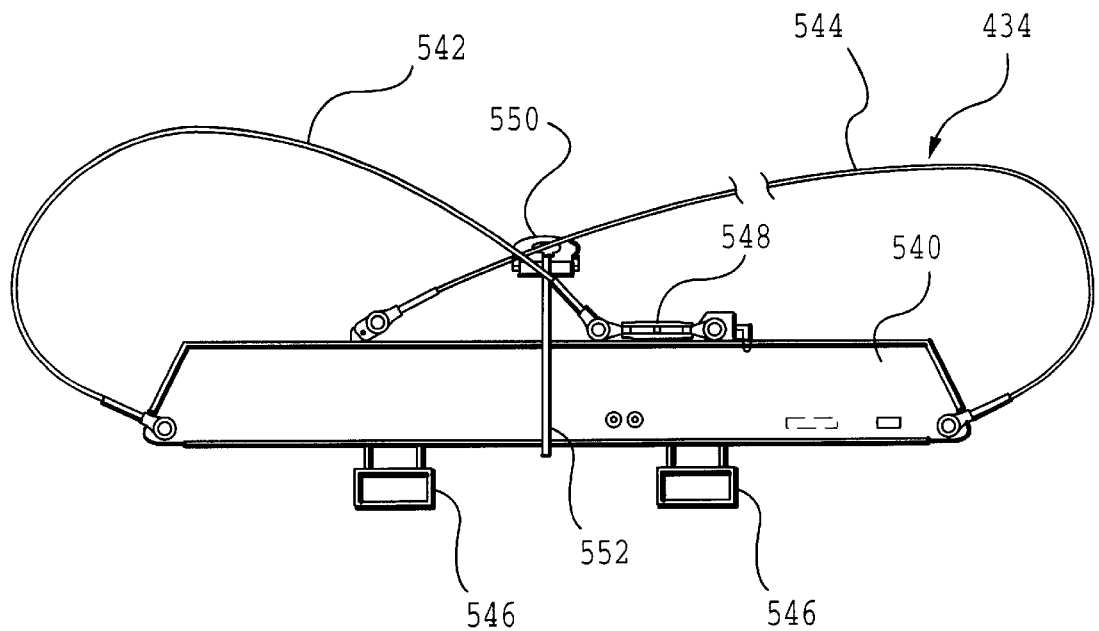
FIG. 51 is a side view of a shroud sling used in the present invention.
Figure 52:
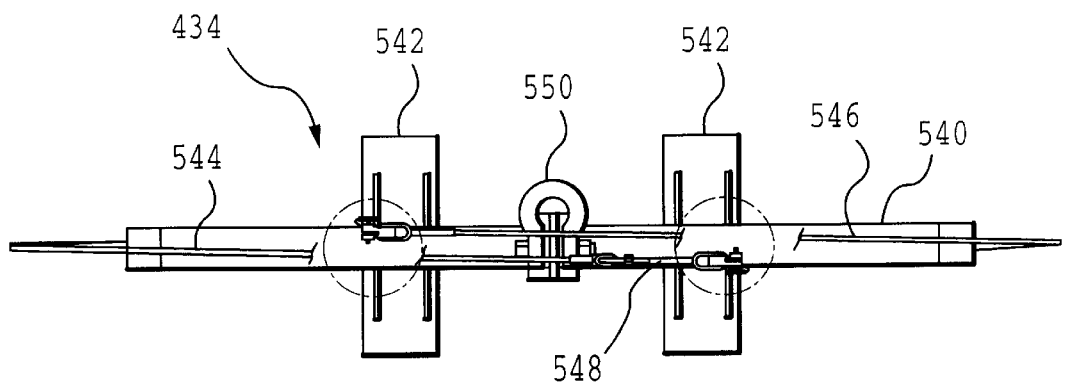
FIG. 52 is a top view of the shroud sling in FIG. 51.

The details of the shroud sling 434 used to upend and lift the shroud 22 are shown in FIGS. 51 and 52. FIG. 51 is a side view of the shroud sling 434 and FIG. 52 is a top view. The shroud sling 434 includes an I-beam 540 and lifting cables 542 and 544 that are suspended from the opposite ends of the I-beam 540. Two forklift channels 546 are attached to the I-beam 540 on opposite sides of its center. The other side of the lifting cable 542 is connected to a turnbuckle 548. The shroud sling 434 further includes a shackle 550 that is attached to the center of the I-beam 540 through a bar 552. The forklift channels 546 provide the means to transport the shroud sling 434 with a forklift. The turnbuckle 548 is provided to adjust the height of the lifting cable 544.

The shroud sling 434 connects to the shroud 22 through removable brackets 560 shown in FIGS. 53 and 54. The removable bracket 560 includes a first attachment plate 562 and a second attachment plate 564. The second attachment plate is rotatably attached to the first attachment plate 562 by means of an axle assembly 565. The first attachment plate 562 includes an axle opening (not shown) located in its center and attachment openings 566. It further includes two openings 568 and 569 which are located on the opposite sides of a longitudinal axis 570 of the second attachment plate 562.

The second attachment plate 564 includes a rotating plate 572 and a transverse plate 574, which is attached to the rotating plate 572. The rotating plate 572 includes an opening 576 that is located near its bottom end and two openings 578 and 580 that are located near its top end on opposite sides of the axis 570. The axle assembly 565 includes an axle 582 and an axle head 584. The axle head 584 passes through the axle hole and opening 578. The axle head 586 has a diameter slightly smaller than the axle hole and the opening 580. This allows the axle head 584 to rotate about an axis formed by the axle assembly 565, thereby enabling the rotating plate 572 to rotate about this axis.

As shown in FIG. 54, the transverse plate 574 includes an opening (not shown) to retain a T-pin 586. It further includes a second opening 588 that is located near its top, for engaging a lifting cable of the shroud sling 434.

The removable bracket 560 functions as follows. It connects to the shroud 22 through the first attachment plate 562. Thereafter, the opening 588 receives one of the two lifting cables 544 or 546, thereby enabling the shroud sling 434 to be connected to the shroud 22. The number of brackets 560 used depends on the number of the lifting cables of the shroud sling 434. In the present invention, the shroud sling 434 includes two lifting cables. Therefore, two brackets 560 are preferably connected to the shroud 428.

The second attachment plate 564 can be locked to either half of the first attachment plate 562. To lock the second attachment plate 564 to the right half of the first attachment plate 562, it is pivoted to the right until the opening 578 coincides with the opening 568. Thereafter, the T-pin 586 is inserted into the coinciding openings to lock the two plates. To lock the second attachment plate 564 to the left half of the first attachment plate 562, it is pivoted to the left until the opening 580 coincides with the opening 569. Thereafter, the T-pin 588 is inserted into the coinciding openings to lock the two plates. This allows the present invention to lock the second attachment plate 564 while the shroud 22 is being lifted to prevent any tilting of the shroud 22.

Figure 55:
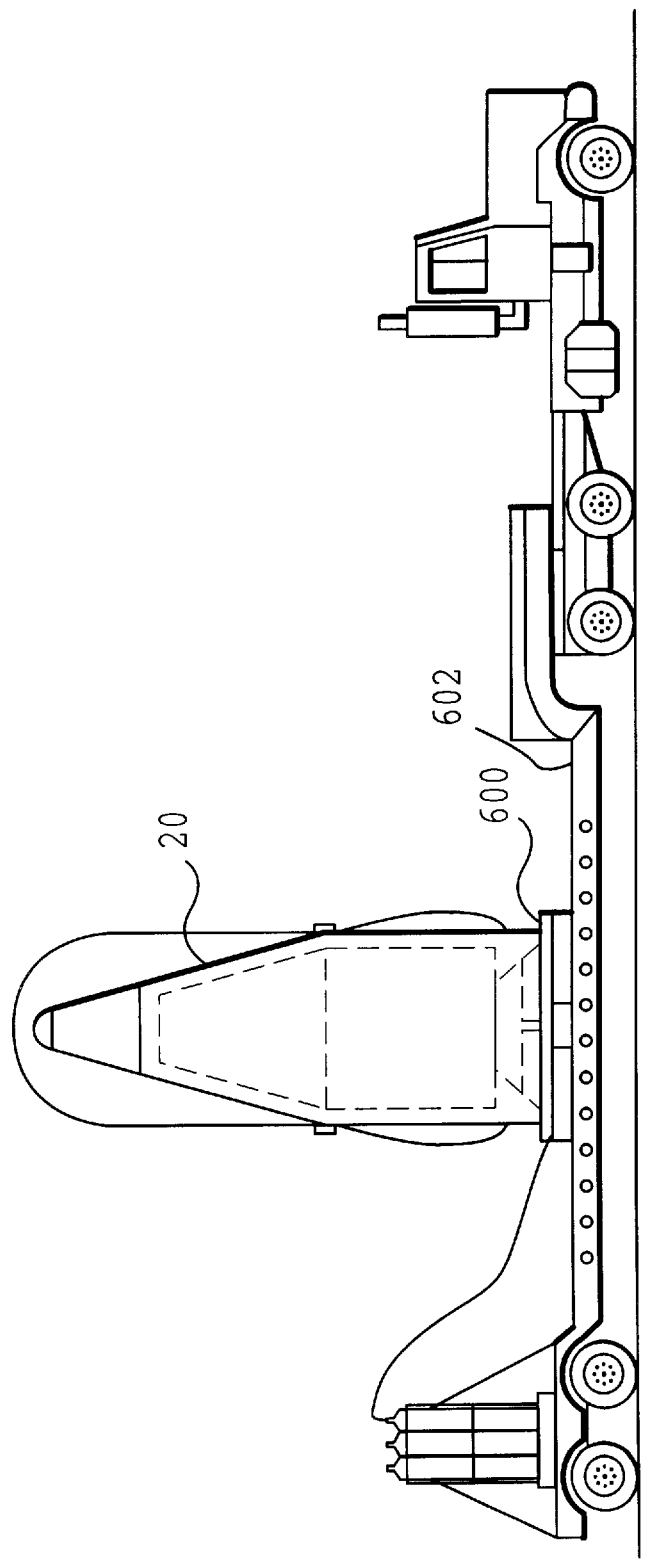
FIG. 55 is a schematic representation of the shroud mounted on a shroud transportation assembly.

Previously, it was presented that in step 410 of the process 390 (FIG. 37) the shroud assembly 20 is transported to the launch area. In this process, the shroud assembly 20 is placed on a shroud transportation assembly 600, as schematically shown in FIG. 55. The shroud transportation assembly 600 includes the transportation stand 341 (FIG. 34) and a shroud transportation adaptor 630 (shown in FIG. 56) that is mounted on the transportation stand 341. As shown in FIG. 53, the shroud transportation assembly 600 is mounted on a trailer 602.

Figure 56:
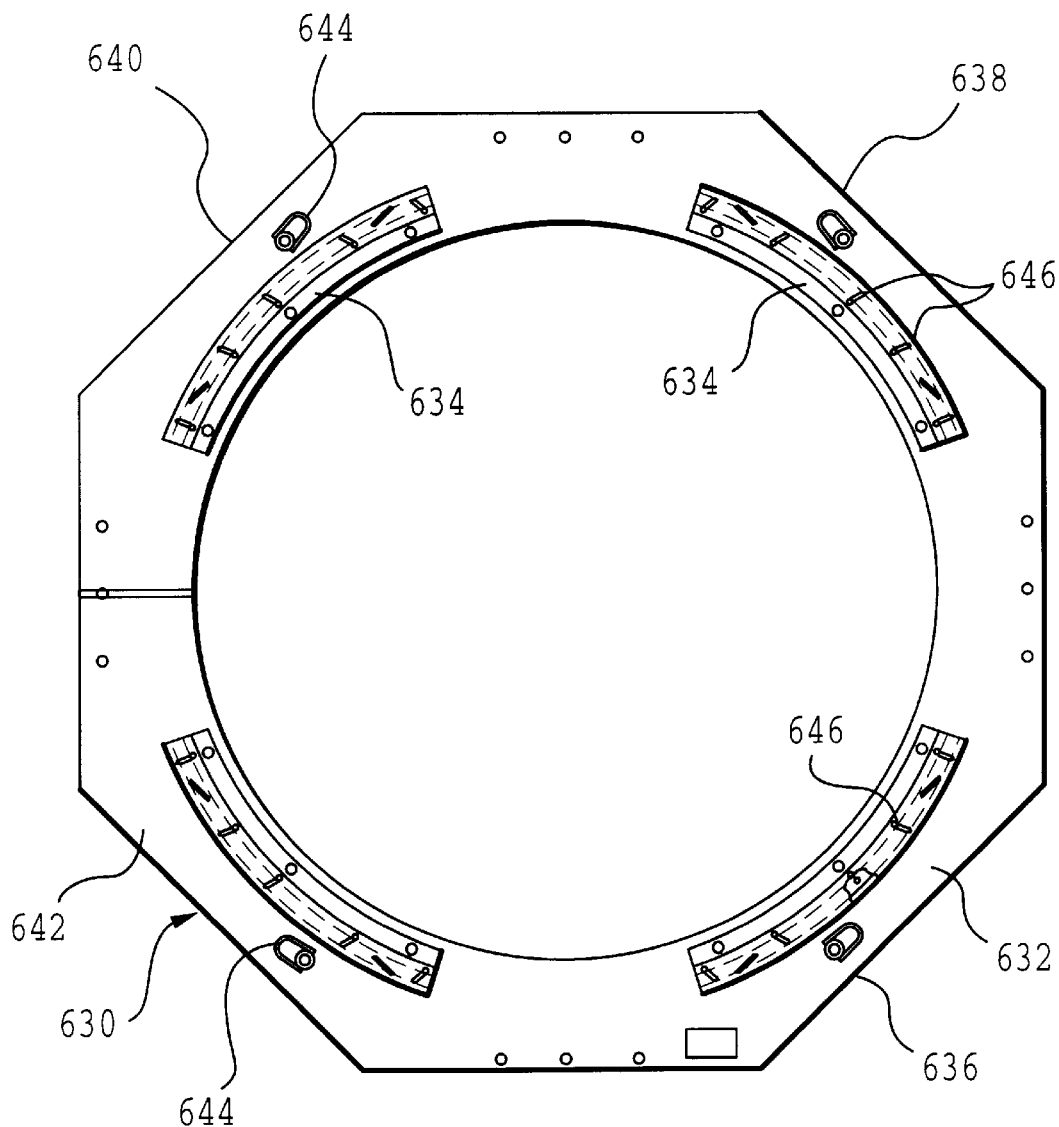
FIG. 56 is a top view of a shroud transportation adapter used in the present invention.

FIG. 56 is a top view of the shroud transportation adapter 630. It includes an annular plate 632 that has an eight-sided outer edge. The transportation adapter 630 further includes four guide brackets 634 which are connected to sides 636–642 of the plate 632. The plate 632 further includes shackles 644 which are attached close to the guide bracket 634. Shackles 644 are used to strap down the shroud assembly 52 during its transportation to the launch site.

Each of the guiding brackets 634 includes a plurality of pins 646. The pins 646 engage the openings provided on the shroud flange as the shroud assembly 52 is being positioned on the shroud transportation adapter 630. The pins are used as a guide means to properly position the shroud assembly 53 on the shroud transportation adapter 630.

A method of assembling the LLV1 launch vehicle was presented above. Furthermore, a series of specially designed and novel tools that are used in the preparation of each section of the launch vehicle were presented. Obviously, the above method and system can equally be used to assemble other launch vehicles, such as the LLV2 or LLV3. For example, the LLV2 includes a second-stage motor in addition to the sections of the LLV1 launch vehicle. Therefore, the method 74 of FIG. 6 must be repeated for the second-stage motor.

The invention claimed is:

1. A method for rapidly assembling a solid-fuel rocket motor launch vehicle vertically comprising the steps of:

receiving a first-stage rocket motor positioned horizontally, said receiving the first-stage rocket motor step comprising the step of receiving at least a base portion of the first-stage rocket motor on a breakover stand, the breakover stand having a pivot engaged with the base portion of the first-stage rocket motor;

rotating, about and relative to the pivot of the breakover stand, the first-stage rocket motor to a vertical position;

positioning the first-stage rocket motor on and above-ground launch platform;

receiving a shroud positioned horizontally;

rotating the shroud to a vertical position;

assembling the shroud with a payload assembly to form a shroud assembly; and positioning the shroud assembly on the first-stage rocket motor.

2. The method of claim 1 wherein the step of rotating the first-stage rocket motor comprises the step of:

lifting at least a top portion of the first-stage rocket motor with a lifter rotatable interconnected to the first-stage rocket motor.

3. The method of claim 1 wherein the step of receiving the shroud further includes the steps of:

receiving the shroud positioned horizontally on a shroud skid having a skid pivot, the shroud having a nose and a base;

attaching a handling bar to the base of the shroud; and attaching the handling bar to the skid pivot.

4. The method of claim 3 wherein the step of rotating the shroud further includes the step of lifting the nose of the shroud with a lifter rotatably attached to the shroud by lifting brackets.

5. The method of claim 1 wherein the payload assembly further includes an adapter section and a payload assembled on the adapter section.

6. The method of claim 1 further including the step of positioning an equipment section on the first-stage rocket motor prior to the shroud assembly.

7. The method of claim 6 wherein the step of positioning the equipment section on the first-stage rocket motor further includes the step of lifting the equipment section from a build-up stand with a lifter.

8. The method of claim 1 further including the steps of:

positioning an interstage section on the first-stage rocket motor; and positioning a final stage rocket motor on the interstage section.

9. The method of claim 8 wherein the step of positioning the interstage section further includes the step of lifting the interstage section from a build-up stand with a lifter which is attached to the interstage section by removable brackets.

10. A method for vertically and rapidly assembling a solid-fuel rocket motor launch vehicle, comprising the steps of:

receiving a first-stage rocket motor positioned horizontally, wherein said receiving the first-stage motor step includes the step of receiving on a pivot at least a base portion of the first-stage rocket motor, said pivot engaged to one of a breakover stand and a base bracket assembly releasably attached to the base portion;

rotating, about and relative to the pivot, the first-stage rocket motor to a vertical position;

positioning the first-stage rocket motor on and above-ground launch platform;

positioning an inter-stage section on the first-stage rocket motor;

positioning a final-stage rocket motor on the inter-stage section;

positioning an equipment section on the final-stage motor;

receiving a shroud positioned horizontally;

rotating the shroud to a vertical position;

assembling the shroud with a payload assembly to form a shroud assembly; and positioning the shroud assembly on the equipment section.

11. The method of claim 10 wherein the step of rotating the first-stage motor rocket comprises the step of:

lifting at least a top portion of the first-stage rocket motor with a lifter rotatable interconnected to the top portion of the first-stage rocket motor by an upper bracket.

12. The method of claim 10 wherein the step of positioning the interstage section further includes the step of lifting the interstage section from a build-up stand with a lifter which is attached to the interstage section by removable brackets.

13. The method of claim 10 wherein the step of receiving the shroud comprises the steps of:

receiving the shroud positioned horizontally on a shroud skid having a shroud pivot, the shroud having a nose and a base;

attaching a handling bar to the base of the shroud; and attaching the handling bar to the shroud skid.

14. The method of claim 13 wherein the step of rotating the shroud further includes the step of lifting the nose of the shroud with a lifter rotatably attached to the shroud by lifting brackets.

15. The method of claim 10 wherein the payload assembly further includes an adapter section and a payload assembled on the adapter section.

16. The method of claim 10 wherein the step of positioning the interstage section further includes the step of lifting the equipment section from a build-up stand with a lift mechanism.

17. A solid rocket motor launch vehicle assembled vertically on and above-ground launch platform according to the process of:

receiving a first-stage rocket motor positioned horizontally on a trailer;

pivoting, on a breakover stand having a pivot engaged with a first stage rocket motor, the first-stage rocket motor to a vertical position;

positioning the first-stage rocket motor on the launch platform;

receiving a shroud positioned horizontally on a trailer;

pivoting, about a pivot on a shroud skid, the shroud to a vertical position, wherein a portion of the shroud is pivotally engageable with the pivot of the shroud skid;

assembling the shroud with a payload assembly to form a shroud assembly; and positioning the shroud assembly on the first-stage rocket motor.

18. A solid rocket motor launch vehicle assembled vertically on and above ground launch platform according to the process of:

receiving a first-stage rocket motor positioned horizontally on a trailer;

pivoting, about a breakover stand having a pivot, the first-stage rocket motor to a vertical position, wherein a base portion of the first-stage rocket motor is pivotally engaged with the pivot of the breakover stand;

positioning the first-stage rocket motor on the launch platform;

positioning an inter-stage section on the first-stage rocket motor;

positioning a final-stage rocket motor on the inter-stage section;

positioning an equipment section on the final-stage rocket motor;

receiving a shroud positioned horizontally on one of the first and a second trailer;

pivoting, about a shroud skid having a pivot, the shroud to a vertical position, wherein a portion of the shroud is pivotally engageable with the pivot of the shroud skid;

assembling the shroud with a payload assembly to form a shroud assembly; and positioning the shroud assembly on the equipment section.

19. A method for vertically assembling on an above-ground launch pad a solid-fuel rocket motor launch vehicle, comprising the steps of:

receiving a horizontally oriented first-stage rocket motor, wherein a base portion of the first-stage rocket motor is pivotally engaged on a pivot, wherein the pivot is included in one of a breakover assembly and in a base bracket releasably engaged to said base portion;

rotating about the pivot the first-stage rocket motor from a horizontal orientation to a vertical orientation;

positioning the vertically oriented first-stage rocket motor on the above-ground launch platform;

stacking a vertically oriented inter-stage section on the first-stage rocket motor; and stacking a final-stage rocket motor on the inter-stage section.

20. A method, as claimed in claim 19, further comprising, before said receiving step, the steps of:

interconnecting upper and base brackets to upper and base portions, respectively, of the first-stage rocket motor; and interconnecting the upper and base brackets with a horizontal lifting beam.

21. A method, as claimed in claim 20, wherein said receiving the first-stage rocket motor comprises the steps of:

pivotally engaging the pivot with base bracket; and receiving upper portion of the first-stage rocket motor in a forward stand.

22. A method, as claimed in claim 19, wherein said rotating the first-stage rocket motor step comprises the steps of:

lifting an upper portion of the first-stage rocket motor while simultaneously moving the upper portion of the first-stage rocket motor toward the breakover assembly.

23. A method, as claimed in claim 19, wherein said step of positioning the vertically oriented first-stage rocket motor on the above-ground launch platform step comprises the step of:

lifting the first-stage rocket motor upwardly, away from the breakover assembly, with a lifter; and moving the vertically oriented first-stage rocket motor to the above-ground launch platform; and setting the vertically oriented first-stage rocket motor on the launch platform.

24. A method, as claimed in claim 19, further comprising the steps of:

positioning an equipment section on the final-stage rocket motor.

25. A method, as claimed in claim 19, further comprising the steps of:

receiving, on a trailer, a horizontally oriented shroud;

pivoting the horizontally oriented shroud to a vertical orientation;

assembling the shroud with a payload assembly to form a shroud assembly; and interconnecting the shroud assembly to the final-stage rocket motor.

26. A method, as claimed in claim 25, wherein said receiving the horizontally oriented shroud step comprises the steps of:

receiving a base portion of the horizontally oriented shroud on a shroud skid having a skid pivot;

attaching a handling bar to the base portion of the shroud; and attaching the handling bar to the skid pivot, wherein the base portion of the shroud is pivotally interconnected to the handling bar.

27. A method, as claimed in claim 19, wherein the pivot on one of the breakover assembly and base bracket defines a single axis of rotation, the first-stage rocket motor being rotatable about the pivot.

28. A method, as claimed in claim 19, comprising, before said step of stacking the first-stage rocket motor, the step of:

securing the base bracket to the breakover assembly; and detaching the first-stage rocket motor from the second bracket.

* * * * *

UNITED STATES PATENT AND TRADEMARK OFFICE
CERTIFICATE OF CORRECTION

PATENT NO. : 5,850,989
DATED : December 22, 1998
INVENTOR(S) : TRUDEAU et al.

It is certified that error appears in the above-identified patent and that said Letters Patent is hereby corrected as shown below:

At Column 15, Claim 2, line 2, the text "rotatable" has been amended to read --rotatably--.
At Column 15, Claim 11, line 64, the text "rotatable" has been amended to read --rotatably--.

Signed and Sealed this

Twentieth Day of July, 1999

Attest:

Q. TODD DICKINSON

*Attesting Officer*      *Acting Commissioner of Patents and Trademarks*